United States Patent [19]

Kaniwa et al.

[11] Patent Number: 5,617,266

[45] Date of Patent: Apr. 1, 1997

[54] MOTOR STABILIZING CONTROL APPARATUS FOR USE WITH MOTORS, INCLUDING FOR USE WITH A DRUM MOTOR IN A MAGNETIC TAPE SYSTEM

[75] Inventors: Kouji Kaniwa, Yokohama; Kouji Minabe, Katsuta; Hiroya Abe, Katsuta; Yukinobu Tada, Katsuta; Yoshio Narita, Katsuta, all of Japan

[73] Assignee: Hitachi, Ltd., Tokyo, Japan

[21] Appl. No.: 129,371

[22] Filed: Sep. 30, 1993

[30] Foreign Application Priority Data

Nov. 11, 1992 [JP] Japan ................................ 4-301306

[51] Int. Cl.⁶ ..................................................... G11B 21/04
[52] U.S. Cl. .......................... 360/70; 360/73.14; 388/812
[58] Field of Search ....................... 360/70, 73.04–73.09, 360/73.11, 73.14; 388/805, 812, 813, 814, 820; 348/665; 358/329

[56] References Cited

U.S. PATENT DOCUMENTS

| | | | |
|---|---|---|---|
| 4,296,446 | 10/1981 | Zorbalas | 360/73.08 |
| 4,486,794 | 12/1984 | Itoh | 360/70 |
| 4,521,815 | 6/1985 | Tokuyama | 360/73.14 |
| 4,617,588 | 10/1986 | Fukuda | 348/665 X |
| 4,684,976 | 8/1987 | Sugihara et al. | 348/665 X |
| 4,804,894 | 2/1989 | Machida et al. | 360/70 |
| 4,807,049 | 2/1989 | Fukuda | 358/329 X |
| 5,067,033 | 11/1991 | Wakui | 360/70 |
| 5,231,477 | 7/1993 | Okumura et al. | 348/665 X |
| 5,332,956 | 7/1994 | Oh | 318/799 |
| 5,335,189 | 8/1994 | Takayama | 364/565 |

OTHER PUBLICATIONS

"Technical reports of the Television Society of Japan", vol. 12, No. 17, pp. 37–42(1988) (no month).
"Preliminary reports of annual meeting 1991 of the Television Society of Japan", pp. 155–156 (no month).

*Primary Examiner*—Aristotelis Psitos
*Assistant Examiner*—Larry T. Cullen
*Attorney, Agent, or Firm*—Antonelli, Terry, Stout & Kraus, LLP

[57] ABSTRACT

A motor speed control device includes a frequency signal generating circuit for generating a frequency signal proportional to a rotation frequency of a motor, a frequency measuring circuit for measuring a frequency of the frequency signal, a speed error signal extracting circuit for extracting a speed error signal by operation comparing the frequency of the frequency signal with a predetermined control target period, a filter circuit for eliminating rotation frequency components of the motor contained in the frequency signal or the speed error signal and harmonic components thereof to output another speed error signal, and a speed error signal feedback circuit for feeding-back negatively the other speed error signal from the filter circuit to the motor, in which owing to the fact that the filter circuit has predetermined transfer functions, it suppresses non-uniform components contained in the speed error signal and the phase error signal due to the frequency signal (DFG signal) proportional to the rotation speed of the drum as well as an addition signal of them.

13 Claims, 13 Drawing Sheets

MOTOR STABILIZING CONTROL APPARATUS FOR USE WITH MOTORS, INCLUDING FOR USE WITH A DRUM MOTOR IN A MAGNETIC TAPE SYSTEM

BACKGROUND OF THE INVENTION

The present invention relates to a motor control device used for a magnetic recording and reproducing apparatus such as VTR, etc. and a magnetic recording and reproducing apparatus using the same, and in particular to a motor control device capable of rotating stably a motor, even in the case where there are non-uniform components in a rotational speed detection signal from the motor and a magnetic recording and reproducing apparatus using the same.

In a motor control device used for VTR, etc., motor control by digital signal processing is used from points of view that high density integration is easy, that performance and reliability are high, that deregulation can be omitted, etc. In this control by digital signal processing, rotation speed and rotation phase of the motor is detected in a digital manner to compare them with a speed and a phase, which are control targets, respectively. After error signals representing differences thus obtained have been subjected to operation and processing, they are feedback to the motor so as to rotate the motor with a desired speed and phase.

As relating techniques, there are known those reported in documents relating to software servo techniques for VTR, such as e.g. "Technical Reports of the Television Society of Japan", Vol 12, No 17, pp 37 to 42 (1988), "Preliminary Reports of Annual Meeting 1991 of the Television Society of Japan" pp. 155 to 156, etc. These are techniques, by which a kind of comb-shaped filter is inserted into a speed control system or a drum, utilizing the fact that almost all non-uniform components in frequency signals proportional to rotation speed of the drum (hereinbelow called DFG signals) are periodical, in order to eliminate non-uniform components in the DFG signals.

SUMMARY OF THE INVENTION

An object of the present invention is therefore to provide a motor control device capable of suppressing efficiently non-uniform components in DFG signals by easy digital processing to rotate stably a motor with a high precision, even if it is a cheap motor.

Another object of the present invention is to provide a motor control device capable of suppressing in a simple and efficient manner influences of non-uniform components in DFG signals produced in a phase control system, in the case where a sampling rate in the phase control system is increased by means of DFG signals to rotate stably a motor with a high precision.

In order to achieve the above objects, a first aspect of embodiments includes in that a motor speed control device using DFG signals is constructed by using a feedback type comb-shaped filter in a speed control signal generating system, whose characteristics of a feedback system are provided at least with characteristics whose transfer function G1(Z) satisfies Eq. (1) described below (K1: real number, K1<1; N: integer, N>2) and characteristics whose transfer function G2(Z) satisfies Eq.(2) described below (K2: real number, K2<1; M: integer, N>M).

$$G1(Z) = K1 \times \frac{Z(-N)}{[1 - Z(-N)]} \quad (1)$$

$$G2(Z) = \frac{1}{1 + K2 \times \frac{Z(-M)}{[1 - Z(-M)]}} \quad (2)$$

It is noted that Z(−N) represents $Z^{-N}$ and Z(−M) represents $Z^{-M}$, in the above equations as well as the equations in the specification hereinafter.

Further a motor control device, in which a sampling rate in a phase control system is increased by using DFG signals, is so constructed that a speed and phase control signal generating system used therein includes a filter circuit for extracting rotation frequency components of the motor and harmonic components thereof included in speed error signals generated by operation comparing frequencies of DFG signals with a predetermined control target frequency or the DFG signals to eliminate them at the same time; a phase error signal extracting circuit for generating phase error signals by an operation comparing the DFG signals with a predetermined reference phase signal; an integrating circuit for accumulating successively the rotation frequency components of the motor and the harmonic components thereof extracted by the filter circuit stated above; and a subtracting circuit for subtracting integration outputs of the integrating circuit stated above from the phase error signals stated above. Or it is so constructed that a speed and phase control signal generating system used therein includes a phase error signal extracting circuit for generating phase error signals by operation comparing DFG signals with a predetermined reference phase signal; a filter circuit for extracting rotation frequency components of the motor and harmonic components thereof included in the phase error signals thus obtained; a speed error signal extracting circuit for generating speed error signals by operation comparing frequencies of the DFG signals with a predetermined control target frequency; a differentiating circuit for calculating successively variations in the rotation frequency components of the motor and the harmonic components thereof included in the phase error signals thus extracted by the filter circuit stated above; and a subtracting circuit for subtracting differentiation outputs of the differentiating circuit stated above from the speed,. error signals stated above.

Still further a motor control device, in which absolute values of non-uniform components in DFG signals are relatively small, is so constructed that a speed and phase control signal generating system used therein includes a speed error signal extracting circuit for generating speed error signals by operation comparing frequencies of the DFG signals with a predetermined control target frequency; a phase error signal extracting circuit for generating phase error signals by operation comparing DFG signals with a predetermined reference phase signal; an adding circuit for adding the speed error signals and the phase error signals stated above; and a filter circuit for eliminating rotation frequency components of the motor and harmonic components thereof included in addition signals outputted by the adding circuit stated above.

A second aspect of embodiments includes in that a magnetic recording and reproducing apparatus comprises a magnetic head; a drum, on which the magnetic head is mounted; a drum motor, which drives the drum; a drum motor control circuit for controlling the drum motor; a magnetic tape; a capstan and a capstan motor for forwarding the magnetic tape; a capstan motor control circuit for controlling the capstan motor; and a processing circuit for recording and reproducing at least either one of image signals and audio signals; wherein the drum motor control circuit includes a frequency signal generating circuit for generating a frequency signal proportional to the rotation frequency of the motor; a period measuring circuit for measuring a period of the frequency signal; a speed error signal extracting circuit for extracting speed error signals by operation comparing a period of the frequency signal with a predetermined control target period; a filter circuit for eliminating rotation frequency components of the motor and harmonic components thereof included in the frequency signals or the speed error signals to output other speed error signals; and a speed error signal feedback circuit for negatively feeding-back the other speed error signals from the filter circuit to the motor; the filter circuit has a feedback type comb-shaped filter construction; and characteristics of a feedback system in the filter circuit are provided at least with characteristics whose transfer function G1(Z) satisfies Eq.(1) (K1: real number, K1<1; N: integer, N>2)

$$G1(Z) = K1 \times \frac{Z(-N)}{[1 - Z(-N)]} \qquad (1)$$

and characteristics whose transfer function G2(Z) satisfies Eq.(2) (K2: real number, K2<1; M: integer, N>M)

$$G2(Z) = \frac{1}{1 + K2 \times \frac{Z(-M)}{[1 - Z(-M)]}} \qquad (2)$$

The drum motor control circuit may include a frequency signal generating circuit for generating a frequency signal proportional to the rotation frequency of the motor; a period measuring circuit for measuring a period of the frequency signal; a speed error signal extracting circuit for extracting speed error signals by operation comparing a period of the frequency signal with a predetermined control target period; a filter circuit for eliminating rotation frequency components of the motor and harmonic components thereof included in the frequency signals or the speed error signals to output other speed error signals; a phase error signal extracting circuit for extracting phase error signals by operation comparing the frequency signal with a predetermined reference phase signal; an integrating circuit for accumulating successively the rotation frequency components of the motor and the harmonic components thereof extracted by the filter circuit; a subtracting circuit for subtracting the rotation frequency components of the motor and the harmonic components thereof accumulated by the integrating circuit from the phase error signals to output other phase error signals; an adding circuit for adding the other speed error signals outputted by the filter circuit and the other phase error signals outputted by the subtracting circuit; and an added error signal feedback circuit for feeding-back output signals of the adding circuit to the motor.

Owing to the construction described above, the feedback type comb-shaped filter inserted into the speed control signal generating system can suppress rotation frequency components of the drum and harmonic components thereof, which are main components of non-uniformity in the DFG signals, with high Q characteristics almost without decreasing the gain in low frequency regions.

Furthermore, in a motor control device, in which a sampling rate in a phase control system is increased by using DFG signals, the filter circuit for extracting rotation frequency components of the motor and harmonic components thereof included in speed error signals generated by operation comparing periods of DFG signals with a predetermined control target period or the DFG signals to eliminate them at the same time extracts non-uniform components in the DFG signals and at the same time suppresses non-uniform components included in the speed error signals. The integrating circuit integrates the non-uniform components thus extracted, because the non-uniform components in the DFG signals are included in an integrated form in the phase error signals generated by the phase error signal extracting circuit. The subtracting circuit for subtracting integration outputs of the integrating circuit stated above from the phase error signals suppresses the integrated non-uniform components included in the phase error signals by subtraction.

Still further the filter circuit for extracting rotation frequency components of the motor and harmonic components thereof included in the phase error signals extracts non-uniform components included in the phase error signals and at the same time suppresses those non-uniform components. The differentiating circuit differentiates the extracted non-uniform components, because the non-uniform components in the phase error Signals are included in a differentiated form in the speed error signals generated by the speed error signal extracting circuit. The subtracting circuit for subtracting differentiated outputs of the differentiating circuit stated above from the speed error signals suppresses the differentiated non-uniform components included in speed errors by subtraction.

Still further, in a motor control device, in which absolute values of non-uniform components in DFG signals are relatively small, the filter circuit for eliminating rotation frequency components of the motor and harmonic components thereof included in addition signals of the speed error signals and the phase error signals suppresses non-uniform components included in the addition signals of the speed error signals and the phase error signals, which are supplied finally to the motor, all together.

In this way, it is possible to suppress all the non-uniform components included in the speed error signals and the phase error signals due to the non-uniform components included in the DFG signals as well as the addition signals of them.

DESCRIPTION OF THE PREFERRED EMBODIMENTS

Figure 1:
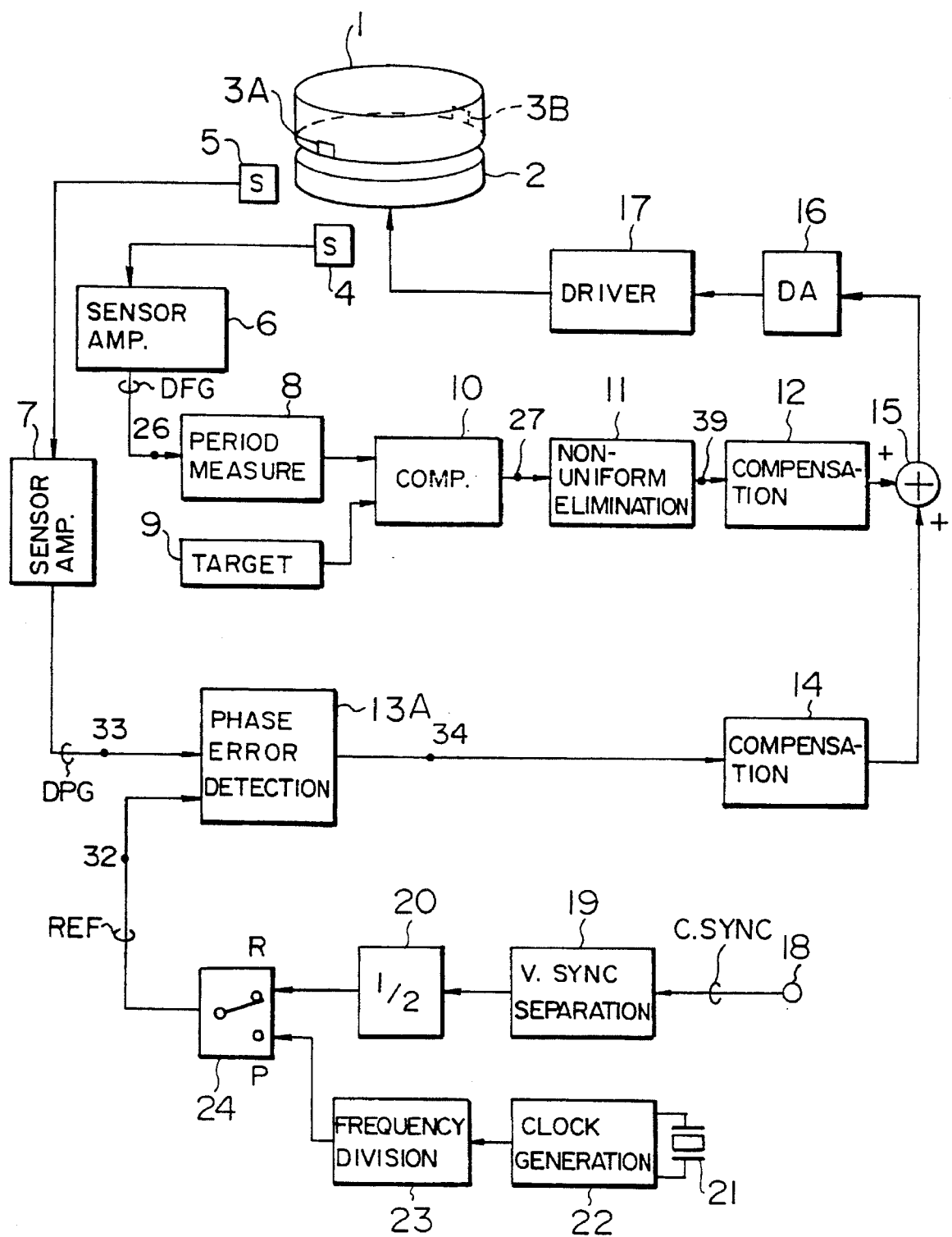
FIG. 1 is a block diagram indicating a motor control device relating to a first embodiment of the present invention.

Hereinbelow the embodiments of the present invention will be explained in detail, referring to the drawings.

FIG. 1 is a block diagram indicating a drum motor control device for VTR relating to a first embodiment of the present invention. In FIG. 1, reference numeral 1 is a drum; 2 is a drum motor; 3A and 3B are magnetic heads; 4 is a DFG sensor (DFG being an abbreviation of Drum Frequency Generator and meaning a frequency signal proportional to the rotation speed of the drum); 5 is a DPG sensor (DPG being an abbreviation of Drum Phase Generator and meaning a phase signal for the rotation of the drum); 6 and 7 are sensor amplifiers; 8 is a period measuring circuit; 9 is a target period generating circuit; 10 is a period comparing circuit; 11 is a non-uniform component extracting filter; 12 and 14 are characteristic compensating circuits; 13A is a phase error detecting circuit; 15 is an adding circuit; 16 is a DA converter; 17 is a motor driver; 18 is an input terminal; 19 is a vertical synchronizing signal separating circuit (hereinbelow called V synchronization separation circuit); 20 and 23 are frequency dividing circuits; 21 is an oscillator made of quartz, etc.; 22 is a clock generating circuit; and 24 is a switching circuit.

At first, a whole operation of the rotation control of the drum 1, on which the magnetic heads are mounted, and as indicated in FIG. 1 will be explained. In FIG. 1, a DFG magnetic pole and a DPG magnetic pole are magnetized in the drum motor 2 connected with the drum 1. The DFG sensor 4 and the DPG sensor 5 detect a DFG signal and a DPG signal, respectively, when the drum rotates. The DFG signal and the DPG signal are supplied to the period measuring circuit 8 and the phase error detecting circuit 13A, after having been amplified by the sensor amplifiers 6 and 7, respectively, and are converted into signals of logic level. The period measuring circuit 8 measures the period of the DFG signal and supplies period data thus obtained to the period comparing circuit 10. The period comparing circuit 10 effects operation comparing the DFG period data with target period data supplied from the target period generating circuit 9 and as the result, if an error is found, it generates a speed error signal. Non-uniform components in the DFG signal are included in this speed error signal. However these components are extracted by the non-uniform component extracting and eliminating filter 11 in the succeeding stage to be eliminated. The speed error signal, from which the non-uniform components in the DFG signal are removed, is supplied to the adding circuit through the characteristic compensating circuit 12. The characteristic compensating circuit 12 effects characteristic compensation such as amplification of the speed error signal, phase delay compensating characteristics, etc. so that characteristics of the speed control system are optimized.

On the other hand, the phase error detecting circuit 13A, to which the DPG signal is supplied, compares this DPG signal with a phase reference signal (hereinbelow called REF signal), which is supplied thereto through the switching circuit 24, in the phase and as the result, if an error is found, it generates a phase error signal. The phase error signal is subjected in the characteristic compensating circuit 14 to characteristic compensation such as amplification, phase delay characteristics, etc. so that characteristics of the phase control system are optimized and then supplied to the adding circuit. The REF signal differs, depending on the control mode, i.e. whether the VTR is in the recording mode or the reproducing mode. In the case of the recording mode, the switching circuit 24 is closed on the R terminal side and therefore a V synchronization signal, whose frequency is divided by 2, serves as the REF signal. This half frequency V synchronization signal is produced by separating a V synchronization signal from a composite synchronization signal in a recorded image signal supplied through the input terminal 18 by means of the V synchronization signal separating circuit 19 and by dividing the frequency thereof by 2 by means of the ½ frequency dividing circuit 20 in the succeeding stage. On the other hand, in the case of the reproducing mode, the switching circuit 24 is closed on the P terminal side, a signal obtained by dividing the frequency of an internal clock serves as the REF signal. This REF signal at the reproducing is produced by dividing the frequency of a stable clock generated by using the oscillator 21 in the clock generating circuit 22 by a predetermined number by means of the frequency dividing circuit 23.

The speed error signal and the phase error signal supplied to the adding circuit are added to each other and supplied to the DA converter 16 as the drum control signal. The DA converter supplies the drum control signal to the motor driver 17 after having converted it into an analogue signal. The motor driver 17 power-amplifies the drum control signal and supplies a motor driving signal to the drum motor 2.

Owing to the construction described above, the drum motor 2 and the drum 1 are rotated with a constant speed and a predetermined phase. Terminal numbers on the circuit are given for facilitating understanding at explanation of different circuits described later.

Figure 2:
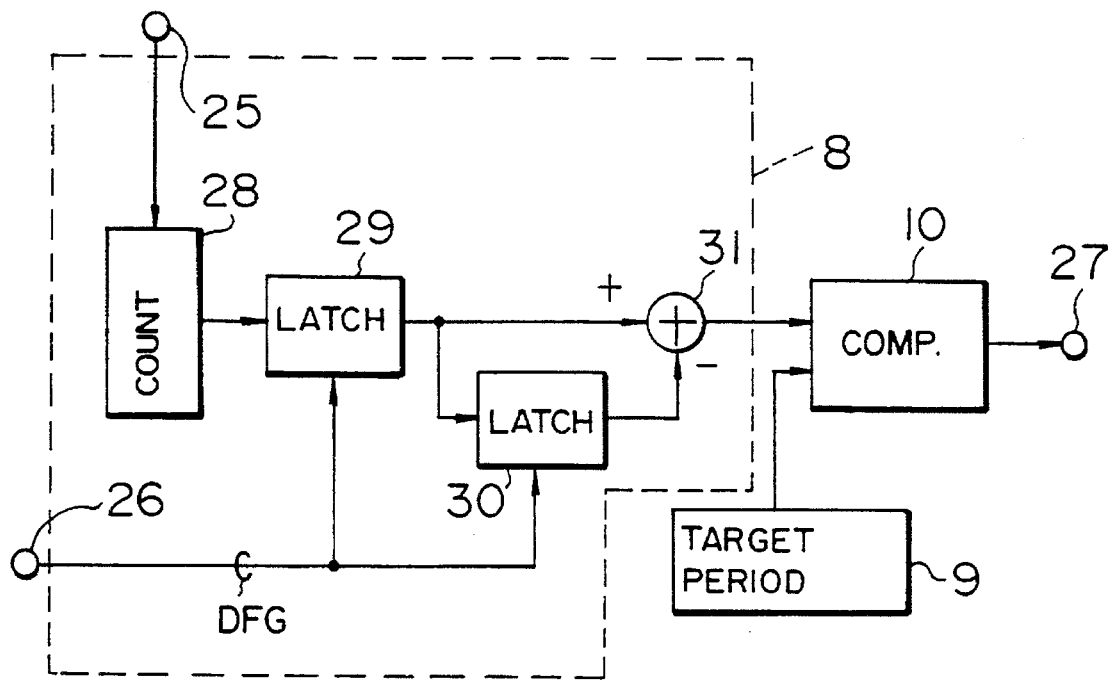
FIG. 2 is a block diagram indicating a concrete example of the construction of the speed error extracting section according to the first embodiment of the present invention.

Now a concrete example of the construction of the period measuring circuit 8 and the phase error detecting circuit 13A for the DFG signal described above will be explained, referring to FIGS. 2 and 3. FIG. 2 is a block diagram indicating a concrete example of the construction of the period measuring circuit, while FIG. 3 is a block diagram indicating a concrete example of the construction of the phase error detecting circuit.

Figure 3:
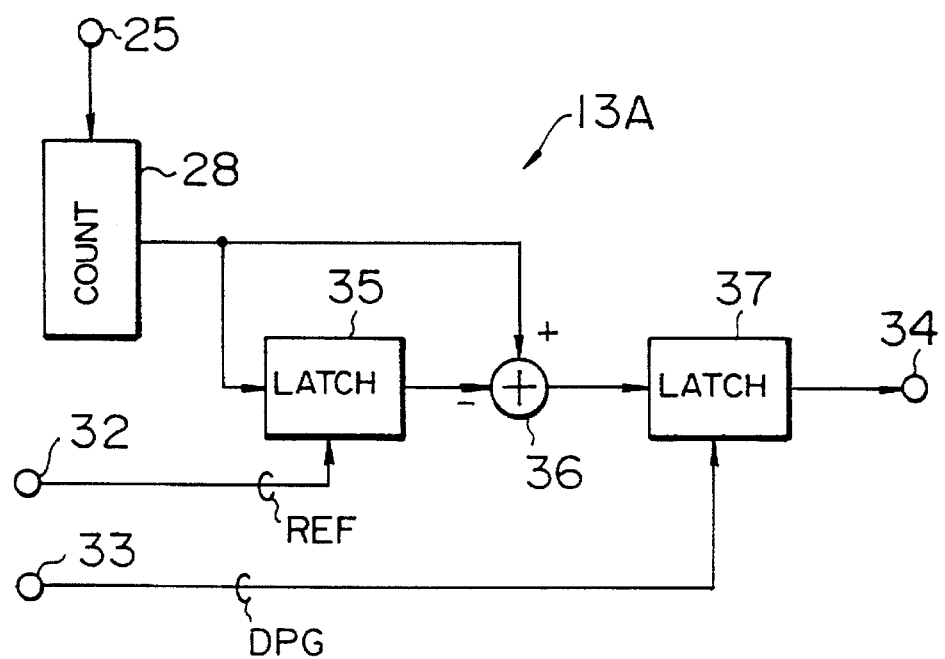
FIG. 3 is a block diagram indicating a concrete example of the construction of the phase error extracting section according to the first embodiment of the present invention.

In FIGS. 2 and 3, reference numerals 25, 26, 32 and 33 are input terminals; 27 and 34 are output terminals; 28 is a counter circuit; 29, 30, 35 and 37 are latch circuits; 31 and 36 are subtracting circuits; and 9 and 10 are the target period generating circuit and the period comparing circuit, respectively, explained by referring to FIG. 1. In the period measuring circuit indicated in FIG. 2, the counter circuit 28 counts continuously the clock generated by the clock generating circuit 22 and supplied thereto through the input terminal 25. The count value thus obtained is supplied to the latch circuit 29. Although this clock is not indicated in the figure, it is a stable clock generated by the clock generating circuit indicated in FIG. 1. The latch circuit 29 latches the count value obtained by the counter circuit 28, e.g., at the rising edge of the DFG signal supplied thereto through the input terminal 26. Latched data in the latch circuit 29 are supplied to the "+" terminal of the subtracting circuit 32 and the latch circuit 30 in the succeeding stage 30. Similarly to the latch circuit 29, the latch circuit 30 latches the latched data in the latch circuit 29, e.g., at the rising edge of the DFG signal and supplies them to the "−" terminal of the subtracting circuit 31. Consequently the subtracting circuit 31 subtracts a count value of the counter 28 with an interval of one period of the DFG signal and outputs period measurement data of the DFG signal. These period measurement data are subjected in the period comparing circuit 10 to an operation comparing them with target period data generated by the target period generating circuit 9 to obtain period error data i.e. speed error data, Which are outputted through the output terminal 27.

On the other hand, in the phase error detecting circuit indicated in FIG. 3, the latch circuit 35 latches the count value of the counter circuit 28 with the timing of the DFG signal supplied thereto through the input terminal 32 and supplies latched data to the "−" terminal of the subtracting circuit 36. The count value of the counter circuit 28 is inputted to the "+" terminal of the subtracting circuit 36. The subtracting circuit 36 subtracts therefore the latched data in the latch circuit 35 from the count value and supplies subtraction data to the latch circuit 37 in the succeeding stage. The latch circuit 37 latches the subtraction data obtained by the subtracting circuit 36 with the timing of the DFG signal supplied thereto through the input terminal 33 and output the latched data through the output terminal 34. Since these latched data in the latch circuit correspond to variations of the count value in the counter 28 from the input timing of the REF signal to the input timing of the DPG signal, they represent a phase comparison signal between the REF signal and the DPG signal, i.e. the phase error signal. In many cases, quantization precision of the speed error signal is set so as to be higher than that of the phase error signal. For this reason, in the speed error signal generating system data starting from the least significant bit (LSB) in the counter 28 are used, while in the phase error signal generating system, the count value is used, starting, e.g., from the fourth bit counted from the least significant bit, excluding the least significant 3 bits.

Now the filter 11 for extracting and eliminating non-uniform components in the DFG signal, which is the most important part of the present embodiment, will be explained in detail.

At first, frequency components of the non-uniformity in the DFG signal will be explained. The non-uniformity in the DFG signal is produced by fluctuations in magnetization of the FG magnetic pole, fluctuations in mounting precision for the FG coil, etc. as well as fluctuations in the working point of the FG sensor amplifier, etc. Consequently almost all these non-uniform components are distributed on non-uniformities in the periodicity, depending on the rotation of the drum, i.e. the rotation frequency of the drum and harmonic frequencies thereof. Therefore a property required for the filter 11 for extracting and eliminating non-uniform components in the DFG signal is how rapidly it decreases only the rotation frequency of the drum and the harmonic frequencies thereof.

Figure 4:
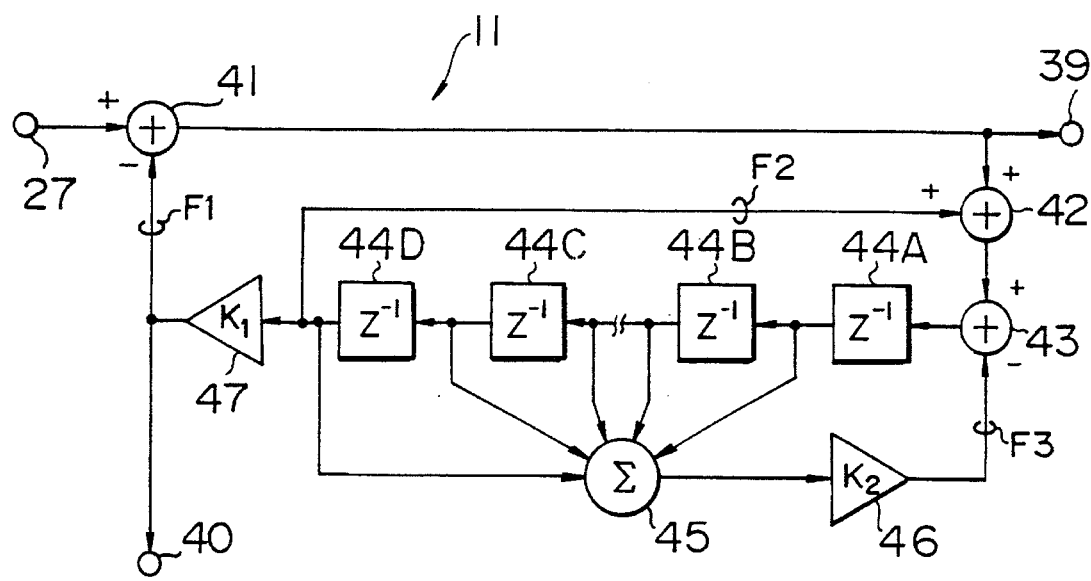
FIG. 4 is a block diagram indicating a concrete example of the construction of the non-uniform component extracting filter according to the first embodiment of the present invention.
Figure 5:
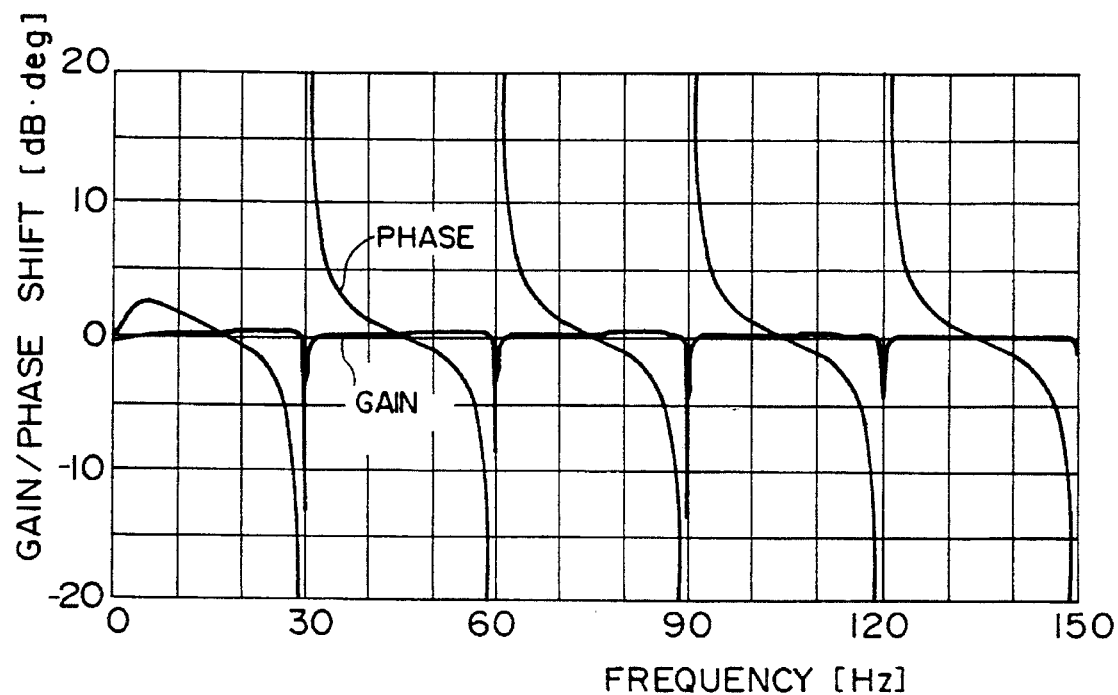
FIG. 5 is a diagram for explaining frequency characteristics of the non-uniform component extracting filter according to the first embodiment of the present invention.

Hereinbelow the construction and characteristics of the filter 11 for extracting and eliminating non-uniform components in the DFG signal will be explained concretely, referring to FIGS. 4 to 6. Here, in order to facilitate understanding, explanation will be made, taking a case where it is supposed that the rotation frequency of the drum is 30 Hz, which is the frame frequency of the NTSC system image signal (strictly speaking, it is 29.97 . . . Hz, but in order to simplify the explanation, it is supposed that it is 30 Hz), and that the DFG rate (number of DFG signals produced for one turn of the drum) is 12 as an example. Consequently the frequency of the DFG signal in this case is 360 Hz. FIGS. 4 and 5 are block diagrams indicating two concrete examples of the construction of the non-uniform component extracting and eliminating filter 11 and FIG. 5 is a diagram representing frequency characteristics of the non-uniform component extracting and eliminating filter 11.

Figure 7:
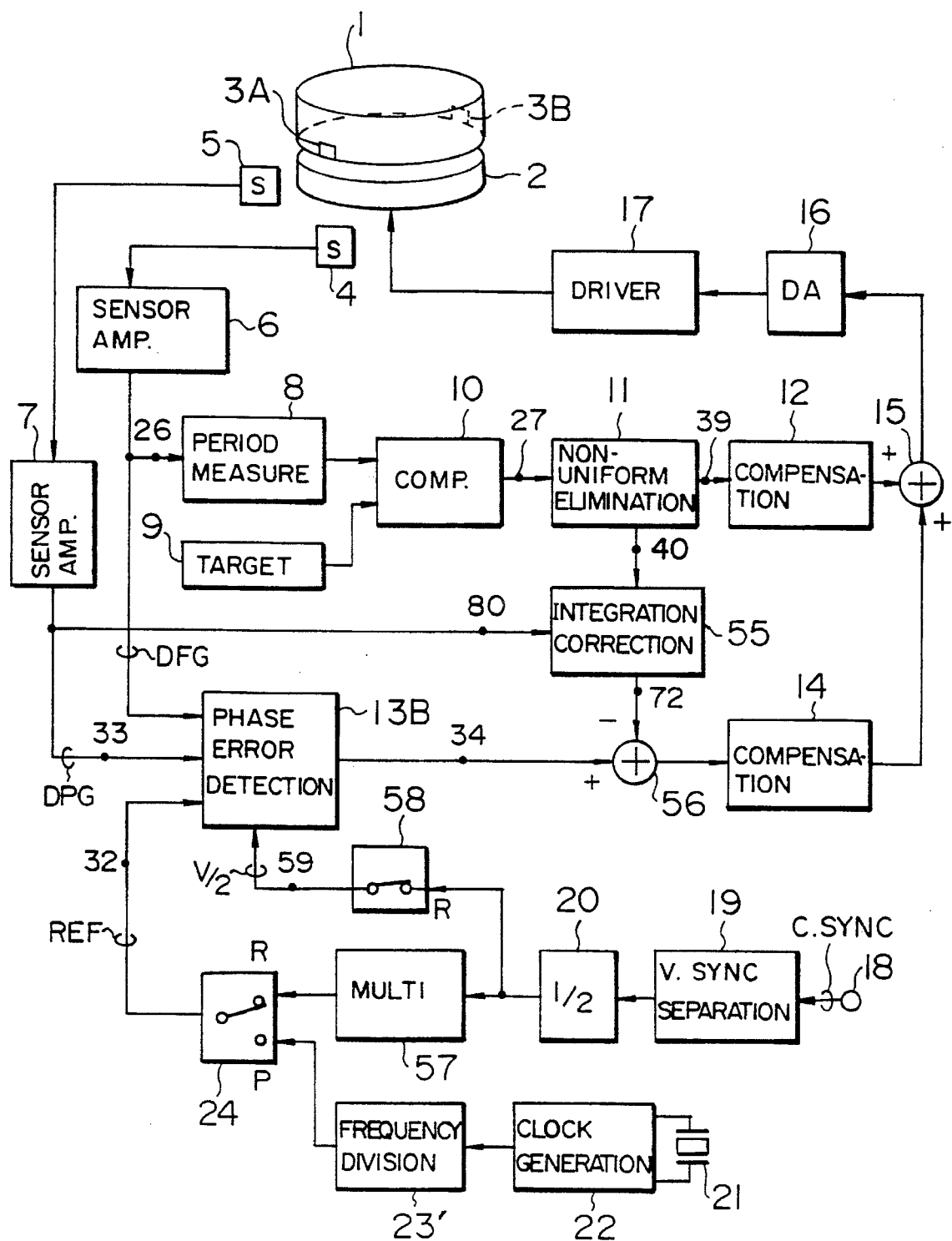
FIG. 7 is a block diagram indicating a motor control device relating to a second embodiment of the present invention.

In FIG. 4, reference numeral 27 is an input terminal for the speed error signal; 39 is an output terminal for the speed error signal, from which non-uniform components are removed; 40 is an output terminal for the non-uniform components (the output terminal 40 is unnecessary for the present embodiment, but it is used in another embodiment indicated in FIGS. 7 and followings); 41 and 43 are subtracting circuits; 42 and 45 are adding circuits; 44A to 44D are delaying circuits; and 46 and 47 are coefficient circuits. The non-uniform component extracting and eliminating filter 11 is a feedback type comb-shaped filter and a feedback signal system F1 includes further two internal feedback signal systems F2 and F3.

The internal feedback signal system F2 has the delaying circuits 44A to 44D, which hold specified frequency components (so-called comb frequency) determined by the number of stages of the delaying circuits 44A to 44D and the delay time (which is a reciprocal of the sampling frequency of the input data). In the present embodiment, since the rotation frequency of the drum is 30 Hz and the DFG rate is 12, it is supposed that the number of stages of the delaying circuits 44A to 44D is 12 and that the delay time is 1/360 sec. In this way, the frequency components of the signals held in the delaying circuits 44A to 44D are the rotation frequency component of the drum and harmonic frequency components thereof, which are the non-uniform components in the DFG signal.

On the other hand, since this non-uniform component extracting and eliminating filter 11 makes it possible to transmit direct current and low frequency signals, the internal feedback signal system F3 described above eliminates DC components and low frequency signal components of the data held in the delaying circuits 44A to 44D so that there exist neither DC components nor low frequency signal components of the inputted speed error signal in the feedback signal system F1.

FIG. 5 indicates frequency characteristics of the non-uniform component extracting and eliminating filter 11 constructed as described above. The characteristics indicated in FIG. 5 are those obtained when the coefficient K1 of the coefficient circuit 47 is set at $\frac{1}{16}$ and the coefficient K2 of the coefficient circuit 46 is set at $\frac{1}{12}$. From the characteristics indicated in FIG. 5, it can be seen that components of the rotation frequency of the drum and harmonic frequencies decrease rapidly almost without decreasing DC gain nor low region gain, which is an important factor for the motor control. It is possible by choosing a smaller value for the coefficient K1 to make attenuation for the rotation frequency of the drum and harmonic frequencies thereof further rapid, i.e., to raise the Q value of the comb characteristics.

Here the transfer function G(Z) of the non-uniform component extracting and eliminating filter 11 constructed as indicated in FIG. 4 is given by;

$$A(Z)=K2\times Z(-1)\times[1-Z(-N)]+[1-Z(-N)]\times[1-Z(-1)] B(Z)=K1'Z(-N)\times[1-Z(-1)]$$

Supposing that K1, K2: real number, K1<1, K2<1, N: integer, N>1, it can be written as given by following Eq. (3);

$$G(Z) = \frac{A(Z)}{A(Z)+B(Z)} \quad (3)$$

By the construction of the non-uniform component extracting and eliminating filter 11 as indicated in FIG. 4 and described previously, the number of data sets to be added by the adding circuit 45 increases with increasing DFG rate (number of DFG signals produced for one turn of the drum). Therefore processing time increases in the case of software processing by means of a microcomputer, while circuit scale is enlarged in the case of hardware processing. Therefore, by considering the internal feedback signal systems F2 and F3 separately, it is possible to realize a same transfer function as Eq. (3) and in addition, the construction of the non-uniform component extracting and eliminating filter may be changed into that indicated in FIG. 6, where the number of data sets to be added is small. In FIG. 6, the input and output terminals, the adding circuit, the subtracting circuit and the coefficient circuits indicated by the same reference numerals as those used in FIG. 4 are parts equivalent to those indicated in FIG. 4. Different constituent elements are delay circuits 50 and 53, a subtracting circuit 48 and an adding circuit 49.

Figure 6:
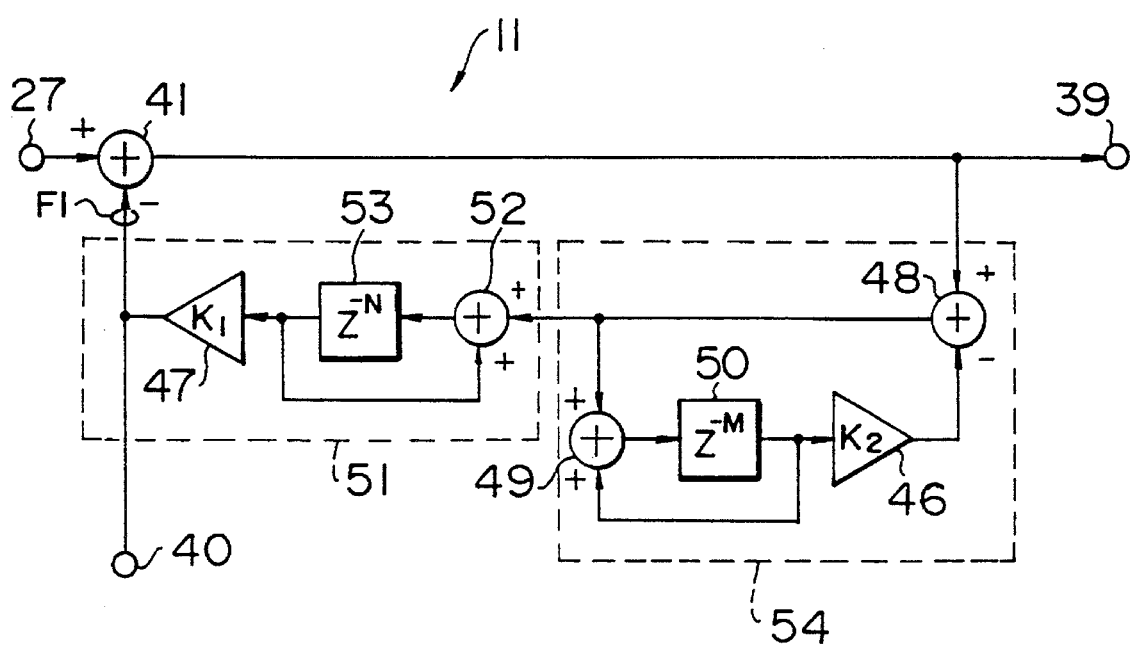
FIG. 6 is a block diagram indicating another concrete example of the construction of the non-uniform component extracting filter according to the first embodiment of the present invention.

In FIG. 6, the feedback signal system F1 is composed of two blocks 51 and 54 enclosed by broken lines. The block 51 has characteristics, whose transfer function G1(Z) is given by Eq. (1) (in Eq. (1), K1: real number, K1<1, N: integer, N>2) and the delaying circuit 53 holds rotation frequency components of the drum, which are non-uniform signal components in the DFG signal, and harmonic frequency components thereof.

$$G1(Z) = K1 \times \frac{Z(-N)}{[1-Z(-N)]} \quad (1)$$

On the other hand, the block 54 enclosed by a broken line has characteristics, whose transfer function G2(Z) is given by Eq. (2) (in Eq. (2), K2: real number, K2<1, M: integer, N>M) and eliminates DC components and low frequency signal components in the signals supplied to the adding circuit 52.

$$G2(Z) = \frac{1}{1 + K2 \times \frac{Z(-M)}{[1-Z(-M)]}} \quad (2)$$

Then the non-uniform components held by the delaying circuit 53 are multiplied by K1 by means of the coefficient circuit 47 and subtracted from the speed error signal supplied through the input terminal 27 to compensate and suppress the non-uniform components in the DFG signal. The transfer function G'(Z) of the non-uniform component extracting and eliminating filter 11 indicated in FIG. 6 is given by;

$$A(Z)=K2\times Z(-M)\times[1-Z(-N)]+[1-Z(-N)]\times[1-Z(-M)]B(Z)=K1\times Z(-N)\times[1-Z(-M)]$$

When it is supposed that K1, K2: real number, K1<1, K2<1, N, M: integer, N>M≧1, it can be represented by;

$$G'(Z) = \frac{A(Z)}{A(Z)+B(Z)} \quad (4)$$

Here, in the non-uniform component extracting and eliminating filter 11 indicated in FIG. 6, in order to make the transfer function identical to the construction indicated in FIG. 4, it is sufficient to set the number of delaying stages in the delaying circuit 50 at 1 (M=1) and the number of delaying stages in the delaying circuit 53 at 12 (N=12).

As explained above, according to the present embodiment, since it is possible to compensate and suppress only the non-uniform components in the DFG signal included in the speed error signal while maintaining a low region gain, which is important for the motor control, in a concentrated manner, characteristics of the motor control system can be designed so as to be optimum without being restricted by phase delay, etc. Consequently, when it is applied to a drum motor for VTR, etc., jitter characteristics of recording and reproducing can be improved. Further, by modifying the construction of the non-uniform component extracting and eliminating filter 11, it is possible to simplify addition processing, etc., and to contribute to down-sizing of the device.

Next a second embodiment of the present invention will be explained. A point, at which the present second embodiment differs from the first embodiment indicated in FIG. 1, includes in the construction of the phase control system for the motor. The present embodiment is so constructed that the sampling rate of the phase control system is raised by using the DFG signal. The present embodiment will be explained successively, referring to FIGS. 7 to 11. FIG. 7 is a block diagram indicating a drum motor control device for VTR relating to the present embodiment. In FIG. 7, the constituent elements indicated by same reference numerals as those used in FIG. 1 are equivalent to the corresponding elements in FIG. 1 and the construction and the operation thereof are identical. New or different blocks are a phase error detecting circuit 13B, a frequency dividing circuit 23', an integration correcting circuit 55, a subtracting circuit 56, a multiplying circuit 57 and switch circuit 58.

In FIG. 7, it is the phase error detecting circuit 13B that plays an important role to increase the sampling rate in the phase control system by using the DFG signal. The DFG signal and the DPG signal amplified to a logic level by the sensor amplifiers 6 and 7, respectively, as well as the REF signal and the ½-frequency-divided V synchronization signal (hereinbelow called V/2 signal) supplied through the switch circuits 24 and 58, respectively, are supplied to the phase error detecting circuit 13B. Among the signals indicated above supplied to the phase error detecting circuit 13B, the REF signal has a frequency different from that of the REF signal described previously, referring to FIG. 1. Here, at first, generation of the REF signal will be explained.

The REF signal differs, depending on the control mode of the motor, i.e. whether the VTR is in the recording mode or in the reproducing mode. At first, in the case of the recording mode, since the switch circuit 24 is closed on the R terminal side, the REF signal is a signal obtained by multiplying the ½-frequency divided a vertical synchronization signal by means of the multiplying circuit 57. The multiplication factor used in the multiplying circuit 57 is set at the ratio of the frequency of the DFG signal to the rotation frequency of the drum. In this way, the REF signal at the recording mode is a signal, whose frequency is in accordance with a target frequency of the DFG signal, synchronized with the vertical synchronization signal. On the other hand, in the case of the reproducing mode, the switch circuit 24 is closed on the P terminal side and the REF signal is a signal obtained by frequency-dividing the internal clock by means of the frequency dividing circuit 23'. It is because the frequency dividing ratio thereof differs from that of the ½-frequency-dividing circuit 23 that "'" is attached to the frequency dividing circuit 23'. The REF signal at the reproducing mode is a signal obtained by frequency-dividing the clock generated by the clock generating circuit 22 by means of the frequency dividing circuit 23' so as to obtain a frequency, which is in accordance with that of the DFG signal at the drum target speed. Similarly to the first embodiment, also in the present embodiment, since the rotation frequency of the drum motor is set at 30 Hz and the frequency of the DFG signal at that time is set at 360 Hz, the multiplication factor for the multiplying circuit 57 is set at 12 and the REF signal stated above is set at 360 Hz. The terminal numbers on the circuit are indicated in order to facilitate understanding at the explanation of different circuits described later.

Figure 8:
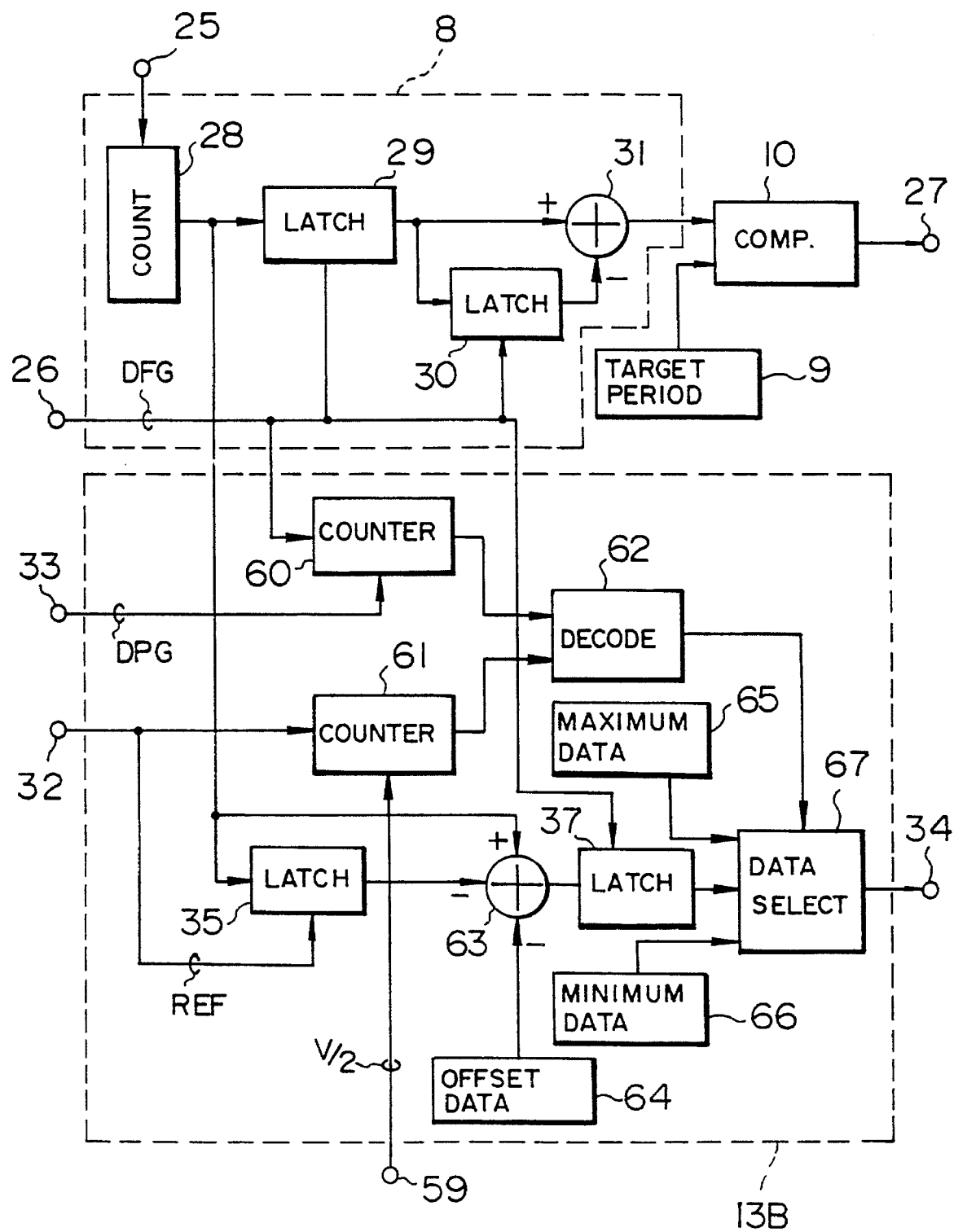
FIG. 8 is a block diagram indicating a concrete example of the construction of the speed error and phase error extracting section according to the second embodiment of the present invention.

Now the phase error detecting circuit 13B will be explained by using the concrete example of the construction indicated in FIG. 8 and the timing chart for principal signals indicated in FIG. 9. The block 8 enclosed by a broken line is identical to the concrete example of the construction of the speed error generating circuit previously explained and indicated in FIG. 2 and therefore explanation thereof will be omitted. In FIG. 8, the block 13B enclosed by a broken line represents a concrete example of the construction of the phase error detecting circuit, in which new constituent elements are an input terminal 59; duodecimal counter circuits 60 and 61; a decode circuit 62; a subtracting circuit 63; offset data, maximum data and minimum data generating circuits 64, 65 and 66, respectively; and a data selector circuit 67.

In the block 8 enclosed by a broken line, the counter circuit 60 counts the DFG signal supplied through the input terminal 26 and it is reset by the DPG signal supplied through the input terminal 33. Further the counter circuit 61 counts the REF signal supplied through the input terminal 32 and it is reset by the V/2 signal (signal obtained by dividing the frequency of the vertical synchronizing signal by 2) supplied through the input terminal 59. Since the V/2 signal is transmitted through the switch circuit 58 indicated in FIG. 7, which is in an open state at the reproducing mode, it is supplied only at the recording. Still further, since the DFG rate is set at 12, the counter 60 and the counter 61 are duodecimal counters. Count values of the counter 60 and the counter 61 are supplied to the decode circuit 62 to be compared and decoded there. The data selector circuit 67 is controlled according to decode results in this decode circuit 62.

On the other hand, the latch circuit 35, which latches the count value in the counter 28 counting the clock, latches the count value with the timing of the REF signal to supply latch data to the subtracting circuit 63. The subtracting circuit 63 subtracts the latch data of the latch circuit 35 and offset data supplied by the offset data generating circuit 64 from the count data from the counter 28 to supply subtraction data to the latch circuit 37 in the succeeding stage. The latch circuit 37 latches the subtraction data from the subtracting circuit 63 to supply the latched data to the data selector circuit 67. Consequently the latched data in the latch circuit 37 are phase comparing data obtained by comparing the DFG signal having a predetermined offset set by the offset data generating circuit 64 with the REF signal, i.e. phase error data.

The data selector circuit 67 selects either one of maximum value data supplied by the maximum data generating circuit 65, minimum value data supplied by the minimum data generating circuit 66, and the phase error data supplied by the latch circuit 37 to be supplied to the output terminal 34.

Necessity of the decode circuit 62 and the data selector circuit 67 described above will be explained by using the timing chart indicated in FIG. 9. In the timing chart indicated in FIG. 9, (1) represents the V/2 signal; (2) the REF signal and the REF count number; (3), (5) and (7) DPG signals; and (4), (6) and (8) DFG signals and DFG count numbers. (3) and (4) represent a state where the phase of the DPG signal and that of the V/2 signal are close to each other; (5) and (6) represent a state where the former is significantly advanced with respect to the latter; and (7) and (8) represent a state where the former is significantly retarded with respect to the latter.

In the phase error detecting circuit 13B, it is detected whether the DPG signal and the V/2 signal are close to each other in the phase relation or they are deviated from each other. This is to detect whether the relation between the DPG signal and the V/2 signal in FIG. 9 is in the state indicated by (1) and (3) or the state indicated by (1) and (5) or (1) and (7). Therefore, in order to detect this phase state, the decode circuit 62 in FIG. 8 compares the count value of the DFG signal (count value of the counter 60) with the count value of the REF signal (count value of the counter 61). Then, if the two count values are in accordance with each other, it is supposed that the phase relation therebetween is in a close state and the data selector circuit 67 is controlled so as to supply the phase error data in the latch circuit 37 to the output terminal 34. On the contrary, in the case where the count value of the counter 60 differs from the count value of the counter 61, the phase relation between the DPG signal and the V/2 signal is judged by comparing the count values and the data select circuit 67 is controlled so as to select the minimum value data when the DPG signal is advanced and the maximum value data when the V/2 signal is advanced.

Figure 9:
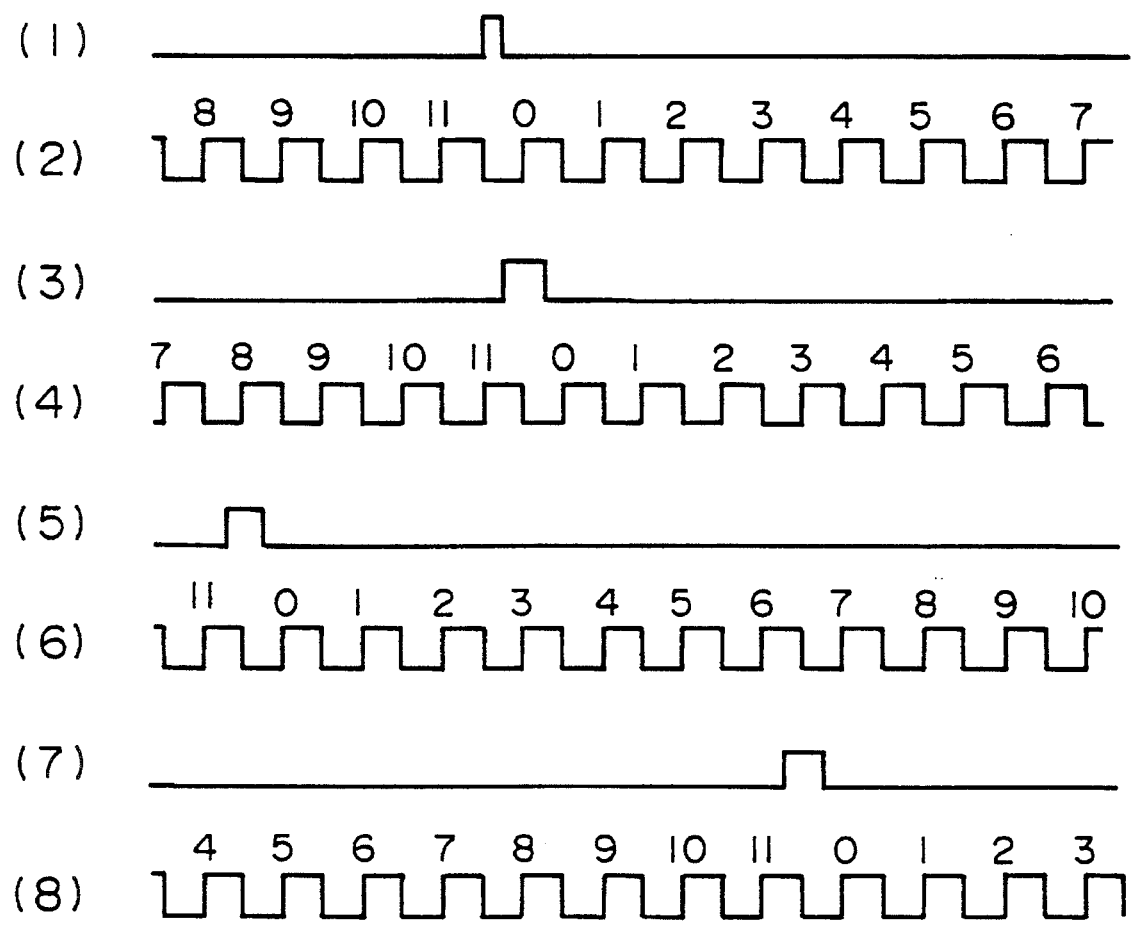
FIG. 9 is a timing chart of main timing signals in the drum control according to the second embodiment of the present invention.

For example, in the case where the phase relation between the REF signal indicated in (2) in FIG. 9 and the DFG signal indicated in (4) is the target phase relation, since the phase error data have an offset of a half period of the REF signal or the DFG signal, the offset data generating circuit 64 generates data for compensating this offset.

Figure 10:
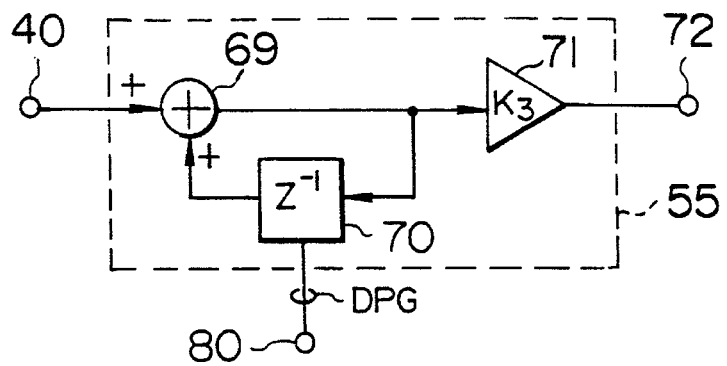
FIG. 10 is a block diagram indicating a concrete example of the construction of an integration correcting circuit according to the second embodiment of the present invention.
Figure 11:
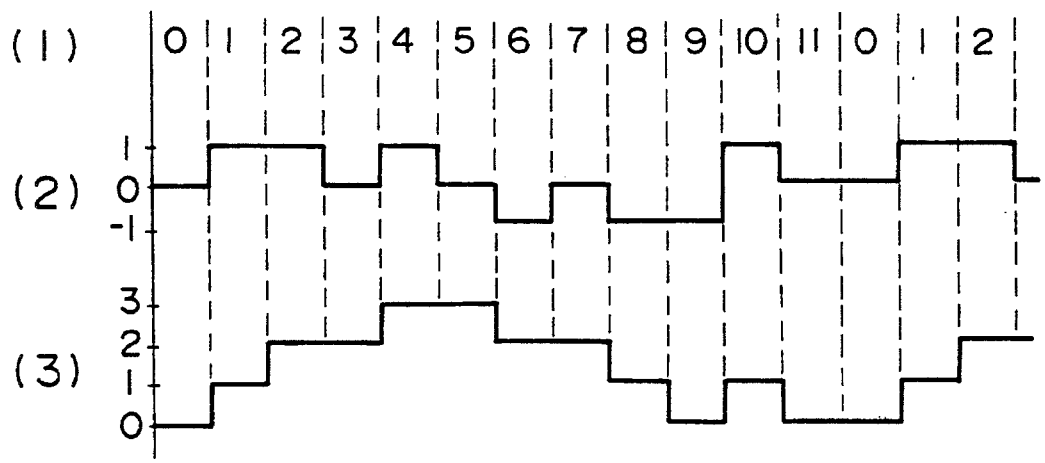
FIG. 11 is a diagram indicating signal waveforms for explaining operation of the integration correcting circuit according to the second embodiment of the present invention.

By the processing described above, the sampling rate of the phase control system is increased. In this case, since the DFG signal is used also in the phase control system, non-uniform components of the DFG signal is contained in the error signal. Therefore there is disposed the integration correction circuit 55 in FIG. 7, which eliminates the non-uniform components of the DFG signal. Hereinbelow the elimination of the non-uniform components of the DFG signal in the phase control system will be explained, referring to FIGS. 10 and 11. FIG. 10 is a block diagram indicating a concrete example of the construction of the integration correction circuit and FIG. 11 shows signal waveforms in the integration correction circuit. In FIG. 10, reference numerals 68 and 80 are input terminals; 69 is an adding circuit; 70 is a delaying (latch) circuit; 71 is a coefficient circuit; and 72 is an output terminal. In the signal waveforms in FIG. 11, (1) represents the number of the DFG signal; (2) an example of non-uniform component data in the DFG signal supplied from the non-uniform component extracting and eliminating filter 11; and (3) integrated data of the non-uniform components in the DFG signal indicated in (2).

The non-uniform component data (supplied from the output terminal 40 in FIG. 6) in the DFG signal in the non-uniform component extracting and eliminating filter 11 indicated in FIG. 4 or 6 previously indicated, which is supplied through the input terminal 68, are supplied to the integrating circuit composed of the adding circuit 69 and the delaying circuit 70. Since the DFG signal is set now at 12 periods for one turn of the drum, the non-uniform components are repeated for every 12 periods of the DFG signal. For example, in the case where the non-uniform components in 12 periods of the DFG signal are those indicated by (2) in FIG. 11, the integration output of the non-uniform components in the DFG signal, which is the output of the adding circuit 69, is that indicated by (3) in FIG. 11.

In the latch circuit 37 in the phase error detecting circuit 13B indicated by the block 82 enclosed by a broken line FIG. 8, the non-uniform components in the DFG signal contained in the phase error signal form signals similar to the waveform indicated by (3) in FIG. 11 described previously. However, in the case where the quantization precision for the phase error signal differs from the quantization precision for the speed error signal, the absolute value of the non-uniform components differs from that of the latter. Therefore the coefficient circuit 71 indicated in FIG. 10 supplies integrated non-uniform components in the phase control system to the subtracting circuit 56 indicated in FIG. 7 through the output terminal 72 after having regulated them to the level of non-uniform components, which are adjusted so as to be in accordance with the former in the period detection precision in the speed control system and the phase detection precision in the phase control system. The subtracting circuit 56 indicated in FIG. 7 subtracts the non-uniform components in the DFG signal from the phase error signal to supply a phase error signal having no non-uniform components to the characteristic compensating circuit 14. The operation after the characteristic compensating circuit 14 is identical to that explained, referring to FIG. 1. In FIG. 10, the DPG signal is supplied from the input terminal 80 to reset data held in the delaying circuit 70. This corresponds to the fact that the integration constant used in the integration is set at a certain value. In the present embodiment, it is so set that integration data are zero at the input timing of the DPG signal serving as the reference timing in the drum rotation phase system.

As explained above, according to the present embodiment, even in the case where the non-uniform components in the DFG signal in the speed control system are efficiently suppressed and at the same time the sampling rate in the phase control system is increased by using the DFG signal to improve servo characteristics of the phase control system, by easy digital processing in a small scale, it is possible to suppress the non-uniform components in the DFG signal in the phase control system by using the non-uniform components in the DFG signal extracted in the speed control system to rotate the motor stably and in a high precision. Therefore it is possible to remove influences of the non-uniform components on the DFG signal in the speed control system and the phase control system and to reduce jitter in recording and reproducing images, when applied to VTR, etc.

Figure 12:
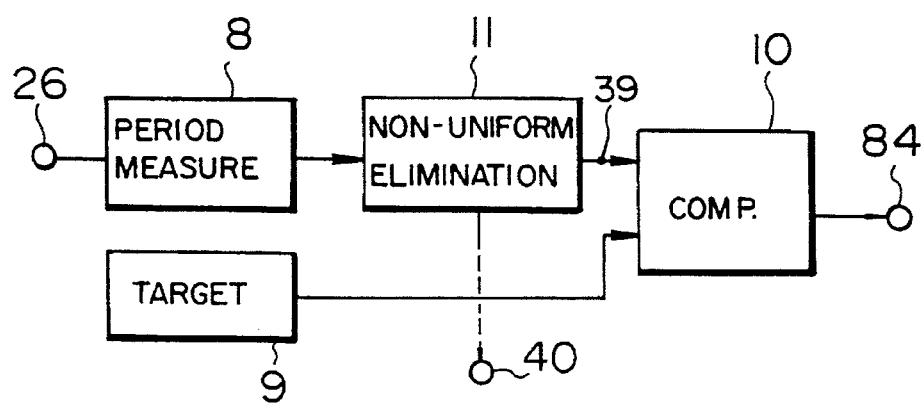
FIG. 12 is a block diagram indicating a modified example, in the case where the insertion position of the non-uniform component extracting filter is changed in the second embodiment of the present invention.

Further, although in the embodiment described above the non-uniform component extracting and eliminating filter 11 is disposed in a stage succeeding the period comparing circuit 10 generating the speed error signal, since the period comparing circuit 10 effects only an operation subtracting target period data (fixed value data) determined, depending on the mode, from measured period data, it is clear that effects similar to those obtained in the present embodiment can be obtained, even if the non-uniform component eliminating filter 11 is moved to a stage preceding the period comparing circuit 10, as indicated in FIG. 12. In FIG. 12, reference numeral 26 is an input terminal for the DFG signal; 84 is an output terminal for the speed error signal; and 68 is an output terminal for the non-uniform components in the DFG signal, which are to be supplied to the integration correcting circuit 55.

Now a third embodiment of the present invention will be explained. A point at which the present third embodiment differs from the second embodiment indicated in FIG. 7 previously explained includes in the construction-of the filter 11 for extracting and eliminating the non-uniform components in the DFG signal in the speed control system and the phase control system. The present embodiment is so constructed also that the sampling rate in the phase control system is increased by using the DFG signal. Hereinbelow the present embodiment will be explained around the point different from the second embodiment indicated in FIG. 7, referring to FIGS. 13 to 15.

Figure 13:
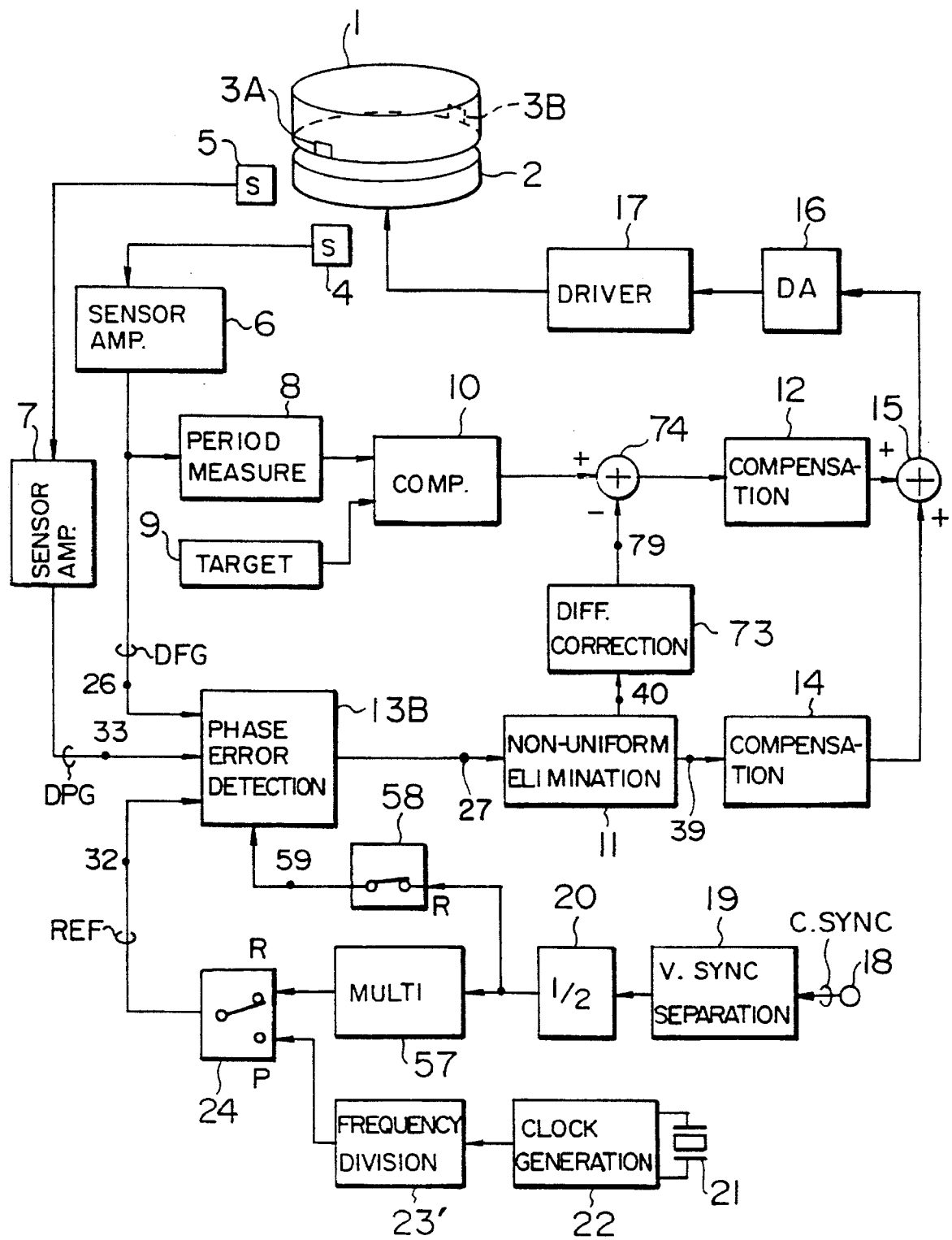
FIG. 13 is a block diagram indicating a motor control device relating to a third embodiment of the present invention.

FIG. 13 is a block diagram of a drum motor control device for VTR relating to the present embodiment. In FIG. 13, the constituent elements indicated by the same reference numerals as those used in FIG. 7 previously explained are equivalent to those indicated in FIG. 7 and the construction and the operation thereof are identical. New or different constituent elements are a differentiation correcting circuit 73 and a subtracting circuit 74. The point at which the present embodiment differs most remarkably from the second embodiment indicated in FIG. 7 includes in that the present embodiment is so constructed that the non-uniform components in the DFG signal are extracted in the phase control system to suppress the non-uniform components in the DFG signal contained in phase error by using non-uniform component extracted data thus obtained and at the same time the non-uniform components in the DFG signal contained in the speed error signal are suppressed by using data obtained by differentiating the non-uniform component extracted data in the phase control system, while the second embodiment indicated in FIG. 7 is so constructed that the non-uniform components in the DFG signal are extracted in the speed control system to suppress the non-uniform components in the DFG signal contained in the speed error signal by using non-uniform component extracted data thus obtained and further the non-uniform components in the DFG signal contained in the phase error signal are suppressed by using data obtained by integrating the non-uniform component extracted data in the speed control system.

In FIG. 13, the phase error signal detected by the phase error detecting circuit 13B is supplied to the non-uniform component extracting and eliminating filter 11 as indicating e.g. in FIG. 4 or 6 previously explained. The non-uniform component extracting and eliminating filter 11 extracts the non-uniform components in the DFG signal contained in the phase error signal to be supplied to the differentiation correcting circuit 73 and at the same time suppresses the non-uniform components in the DFG signal contained in the phase error signal by subtracting the detected non-uniform components from the phase error signal. The differentiation correcting circuit 73 differentiates the non-uniform components in the DFG signal extracted from the supplied phase error signal and supplies them to the subtracting circuit 74 after having corrected them in the level. The subtracting circuit 74 subtracts the non-uniform components in the DFG signal described above from the speed error signal to be supplied to the characteristic compensating circuit 12 as a speed error signal having no non-uniform components. The signal processing and the operation after the characteristic compensating circuit 12 are identical to those described in the first embodiment indicated in FIG. 1. Terminal numbers on the circuit are given for facilitating understanding at explanation of different circuits described later.

Figure 14:
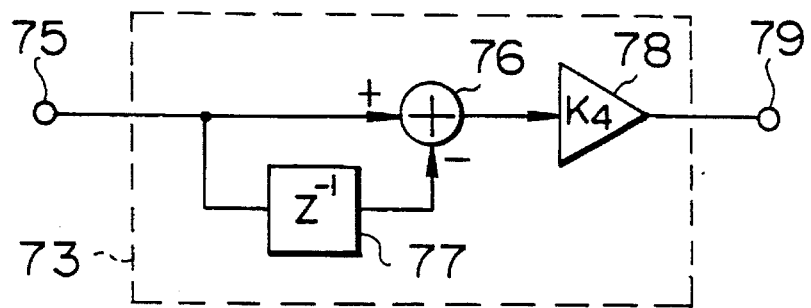
FIG. 14 is a block diagram indicating a concrete example of the construction of a differentiation correcting circuit according to the third embodiment of the present invention.
Figure 15:
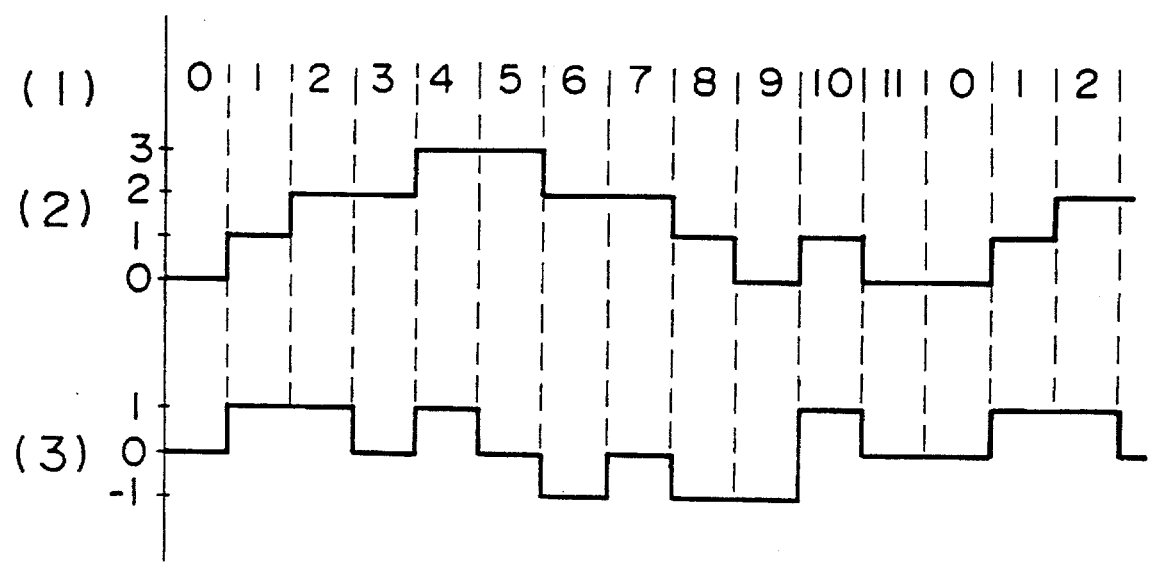
FIG. 15 is a diagram indicating signal waveforms for explaining operation of the differentiation correcting circuit according to the third embodiment of the present invention.

Now the construction and the operation of the differentiation correcting circuit 73 will be explained, referring to FIGS. 14 and 15. FIG. 14 is a block diagram indicating a concrete example of the construction of the differentiation correcting circuit 73 and FIG. 15 show signal waveforms in the differentiation correcting circuit 73.

In FIG. 14, non-uniform component data in the DFG signal in phase error in the non-uniform component extracting and eliminating filter 11 indicated in FIG. 4 and 6 previously explained, supplied through the input terminal 75, are supplied to a differentiating circuit consisting of the subtracting circuit 76 and the delaying (latch) circuit 77. Since the DFG signal is set at 12 periods for one turn of the drum similarly to the preceding embodiment, the non-uniform components are repeated for every 12 periods of the DFG signal. For example, in the case where the non-uniform components in 12 periods of the DFG signal contained in the phase error signal are those indicated by (2) in FIG. 15, a differentiation output of the non-uniform components in the DFG signal, which is an output of the subtracting circuit 76, is that indicated by (3) in FIG. 15. (1) in FIG. 15 shows numbers assigned to the 12 periods of the DFG signal for one turn of the drum and they are count values e.g. of the counter 60 in FIG. 8. In the case where the non-uniform components in the DFG signal contained in the phase error signal can be represented as indicated by (2) in FIG. 15, the non-uniform components in the DFG signal as indicated by (3) in FIG. 15 are contained in the speed error signal detected by the speed error detection section indicated by the block enclosed by a broken line in FIG. 8. The differentiated non-uniform components in the DFG signal indicated by (3) in FIG. 15 are supplied to the subtracting circuit 74 indicated in FIG. 13 through the output terminal 79, after having regulated them to non-uniform components, which are adjusted in the coefficient circuit 78 so as to be in accordance with the former in the period detection precision in the speed control system and the phase detection precision in the phase control system, to be subtracted from the speed error signal.

As explained above, according to the present embodiment, in the case where the sampling rate of the phase control system is increased by using the DFG signal to improve servo characteristics of the phase control system, it is possible to suppress efficiently the non-uniform components in the DFG signal in the phase control system and at the same time to suppress efficiently the non-uniform components in the DFG signal in the speed control system by using the non-uniform components in the DFG signal extracted in the phase control system by easy digital processing in a small scale to rotate the motor stably with a high precision. Consequently there is no need to dispose non-uniform component extracting and eliminating filters 11 separately in the speed control system and the phase control system. Therefore it is possible to remove influences of the non-uniform components in the DFG signal in the speed control system and the phase control system by a small scale construction and to reduce jitter in recording and reproducing images, when applied to VTR, etc.

Now a fourth embodiment of the present invention will be explained. A point at which the present fourth embodiment differs from the second and third embodiments indicated in FIGS. 7 to 15 previously explained consists in the insertion position of the filter 11 for extracting and eliminating the non-uniform components in the DFG signal. The present embodiment is so constructed also that the sampling rate in the phase control system is increased by using the DFG signal. Hereinbelow the present embodiment will be explained around the point different from the second and third embodiments, referring to FIG. 16.

Figure 16:
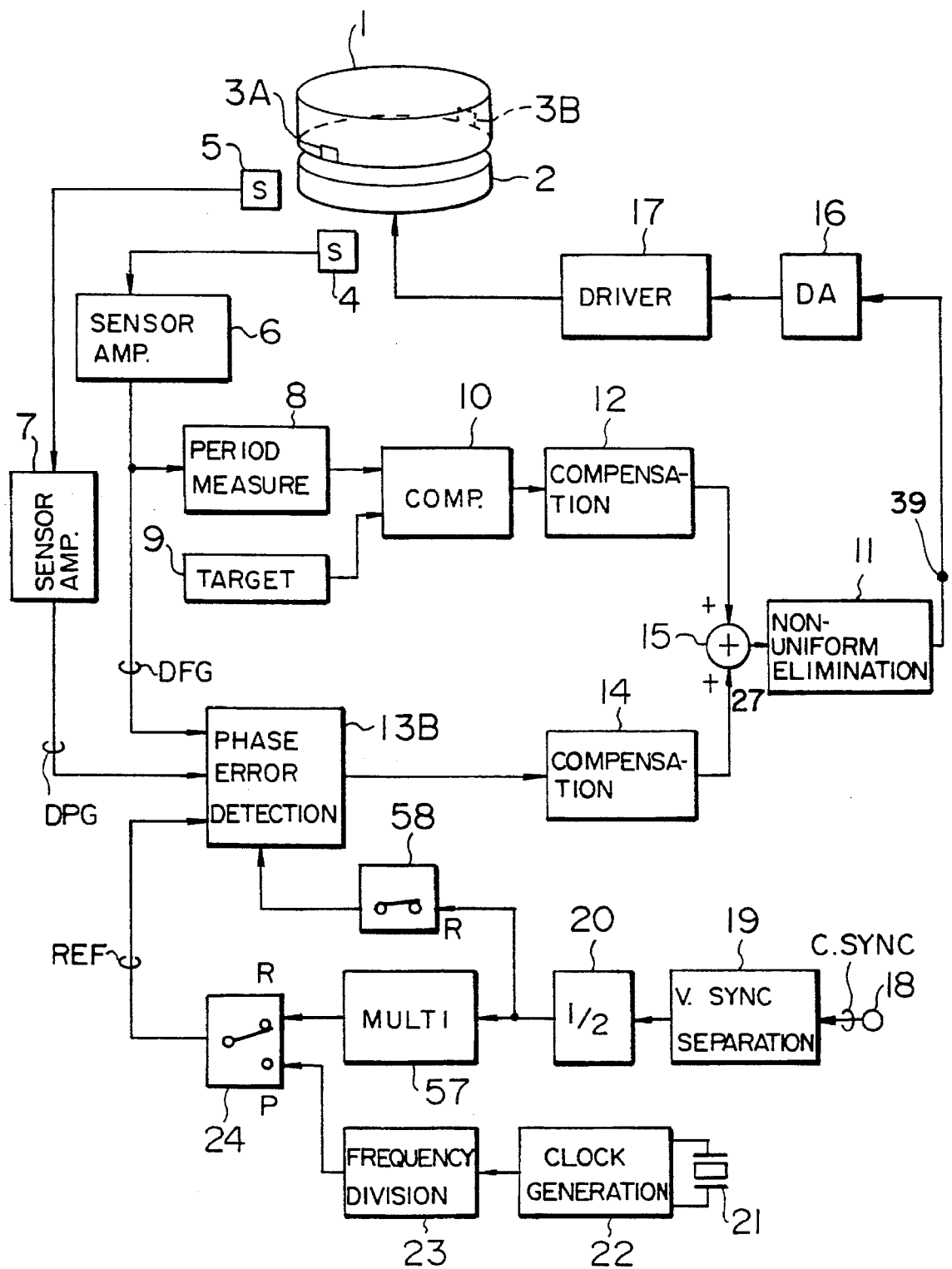
FIG. 16 is a block diagram indicating a motor control device relating to a fourth embodiment of the present invention.

FIG. 16 is a block diagram of a drum motor control device for VTR relating to the present embodiment. In FIG. 16, the constituent elements indicated by same reference numerals as those used in FIG. 13 previously explained are equivalent to those indicated in FIG. 13 and the construction and the operation thereof are identical. There is no newly disposed constituent elements, but the insertion position of the filter 11 for extracting and eliminating the non-uniform components in the DFG signal is different from the corresponding positions in the preceding embodiments. In FIG. 16, the non-uniform component extracting and eliminating filter 11 is disposed in a stage succeeding the adding circuit 15, in which the speed error signal and the phase error signal, both subjected to characteristic compensation, are added to each other. Consequently the non-uniform components obtained by adding the non-uniform components in the DFG signal contained in the speed error signal and the non-uniform components in the DFG signal contained in the phase error signal are extracted and suppressed all together.

However, in the present embodiment, compared with the second and third embodiments, the construction is simple and in a small scale. However, on the other hand, since the non-uniform components are removed after the addition of the speed error signal and the phase error signal, the present embodiment is not suitable e.g. for the case where the absolute value of the non-uniform components is great and therefore it exceeds signal processing dynamic range in the characteristic compensating circuits 12 and 14, etc. disposed in a stage preceding the adding circuit 15 by the non-uniform components. Consequently, in the case where the non-uniform components in the DFG signal are relatively small, the present embodiment can realize further down-sizing with respect to the second and third embodiments described previously.

In the first to fourth embodiments described above, the non-uniform components in the DFG signal can be suppressed more efficiently, if the operation of the filter 11 for extracting and eliminating the non-uniform components in the DFG signal is controlled dynamically within a speed control range and within a phase control range or in the neighborhood thereof, as described below. The speed control range means a range, in which the speed error signal varies almost in linear characteristics with respect to variations in the speed, while the phase control range means a range, in which the phase error signal varies almost in linear characteristics with respect to variations in the phase.

Figure 17:
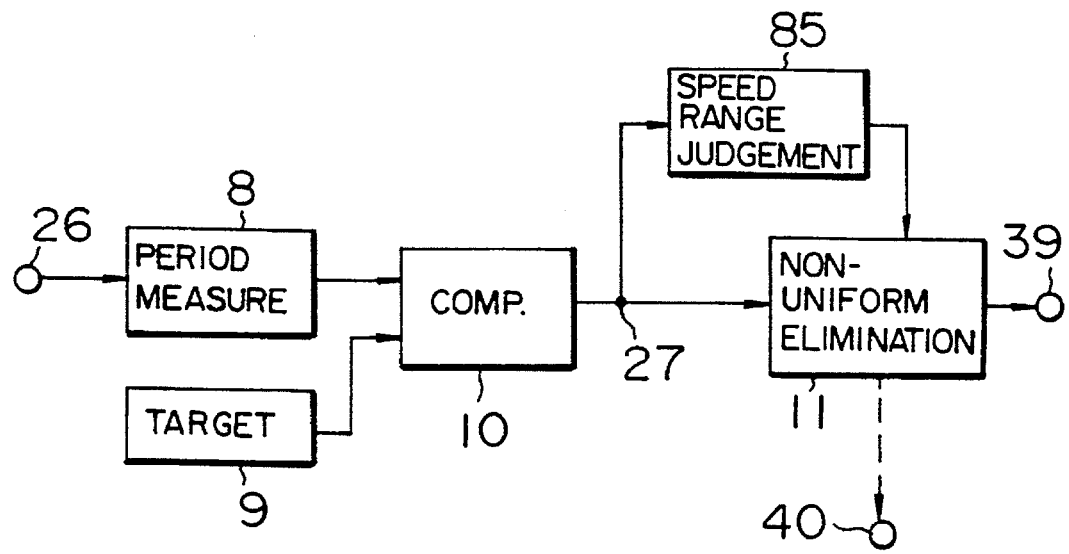
FIG. 17 is a block diagram indicating a modified example of the speed error extracting system, in which a speed range judging circuit is disposed in the first and the second embodiment of the present invention.

In the first and the second embodiment indicated in FIGS. 1 and 7, respectively, a speed range judging circuit 85 as indicated in FIG. 17 is disposed. In FIG. 17, the constituent elements indicated by same reference numerals as those used in FIG. 7 previously explained are equivalent to those indicated in FIG. 7 and the construction and the operation thereof are identical. In FIG. 17, the speed range judging circuit 85 detects the absolute value of an inputted speed error signal. In the case where a value thus detected exceeds a certain value, it judges that the real drum rotation speed is outside of the speed control range and supplies a reset signal to the non-uniform component extracting and eliminating filter 11. The non-uniform component extracting and eliminating filter 11 resets data held in the different delaying circuit 44A to 44D or 50, 53 indicated in FIG. 4 or 6 at zero by this reset signal. In this way it is possible to prohibit data holding, in the case where the drum speed is significantly deviated from the target speed and thus to extract rapidly the non-uniform components with a high precision, when the drum speed approaches the target speed.

Figure 18:
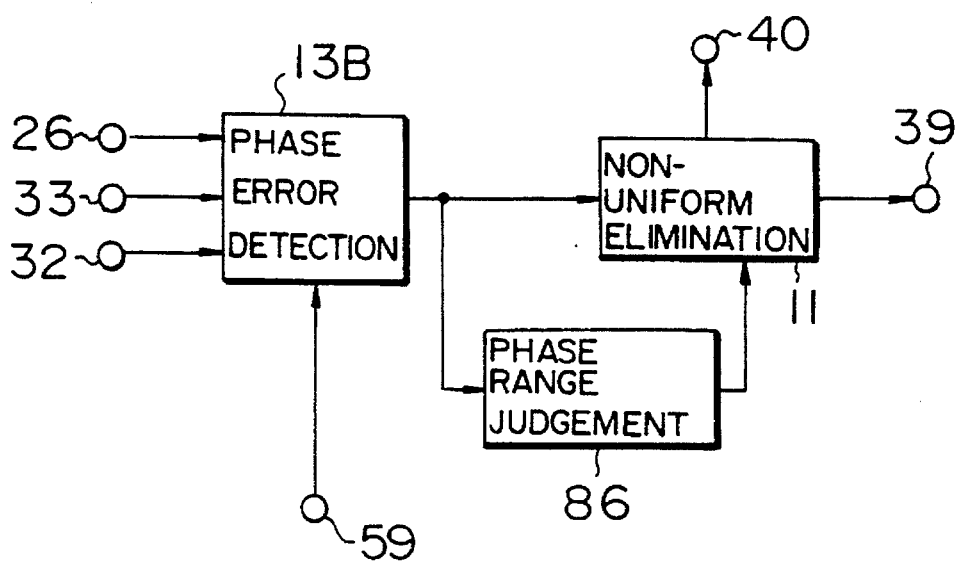
FIG. 18 is a block diagram indicating another modified example of the speed error extracting system, in which a speed range judging circuit is disposed in the third embodiment of the present invention.

On the other hand, in the case of the third embodiment indicated in FIG. 13, in which the non-uniform component extracting and eliminating filter 11 is disposed in the phase control system, a phase range judging circuit 86 as indicated in FIG. 18 is disposed. In FIG. 18, the constituent elements indicated by the same reference numerals as those used in FIG. 13 previously explained are equivalent to those indicated in FIG. 13 and the construction and the operation thereof are identical. In FIG. 18, the phase range judging circuit 86 detects the absolute value of an inputted phase error signal. In the case where a value thus detected exceeds a certain value, it judges that the real drum rotation phase is outside of the phase control range and supplies a reset signal to the non-uniform component extracting and eliminating filter 11. The non-uniform component extracting and eliminating filter 11 resets data held in the different delaying circuit 44A to 44D or 50, 53 indicated in FIG. 4 or 6 at zero by this reset signal. In this way it is possible to prohibit data holding, in the case where the drum phase is significantly deviated from the target phase and thus to extract rapidly the non-uniform components with a high precision, when the drum phase approaches the target phase.

Figure 19:
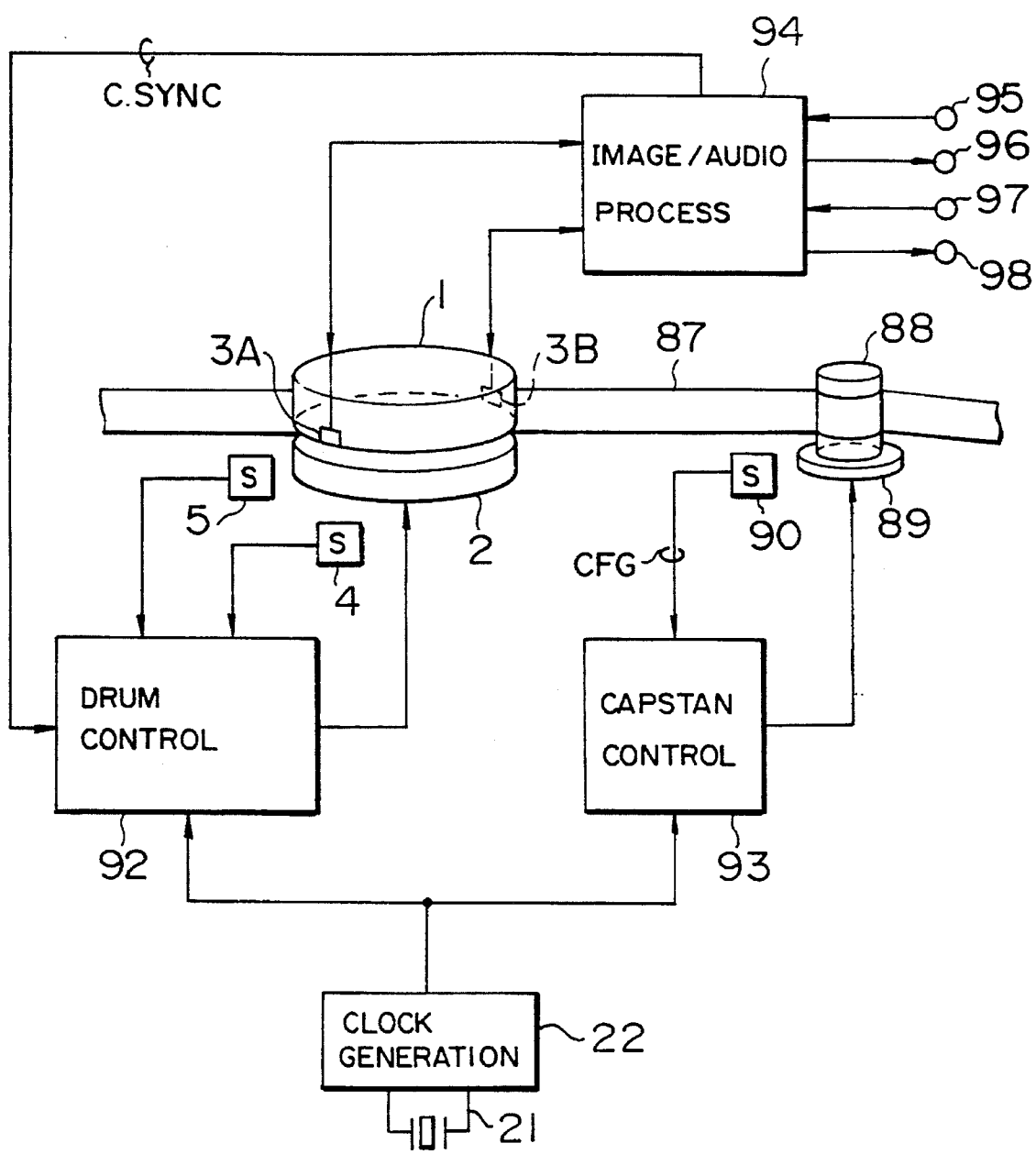
FIG. 19 is a block diagram indicating a magnetic recording and reproducing apparatus provided with the motor control device according to either one of the first to the fourth embodiment of the present invention.

Here an example, in which a motor control device explained above is applied to a magnetic recording and reproducing apparatus (VTR), will be explained, referring to FIG. 19. FIG. 19 is a block diagram indicating to a magnetic recording and reproducing apparatus provided with a motor control device according to the present invention. In FIG. 19, a drum control circuit 92 represents a signal processing system in either one of the motor control devices indicated in FIGS. 1, 7, 13 and 16. Further, in FIG. 19, reference numeral 87 is a magnetic tape; 88 is a capstan; 89 is a capstan motor; 90 is a capstan FG signal (hereinbelow called CFG signal) sensor; 93 is a capstan control circuit; 94 is an image-audio signal processing circuit; 95 is an input terminal for image signals; 96 is an output terminal for the image signals; 97 is an input terminal for audio signals; and 98 is an output terminal for the audio signals. In FIG. 19, the constituent elements indicated by same reference numerals as those used in FIG. 1 previously explained are equivalent to those indicated in FIG. 1 and the construction and the operation thereof are identical.

At first, the operation at recording will be explained. In FIG. 19, the capstan control circuit 93 controls the capstan motor 89 by an operation almost similar to the drum motor control explained previously by using a CFG signal generated so as to be proportional to the rotation speed of the capstan motor 89. In this way, the capstan 88 mounted on the capstan motor 89 rotates with a constant speed to forward the magnetic tape 87. At this time the drum control circuit 92 controls the drum motor 2 so as to be synchronized with the synchronizing signal of the image signal supplied from the image and audio signal processing circuit 94. The magnetic heads 3A and 3B mounted on the drum 1 record image and audio signals to be recorded, converted into a signal form suitable for magnetic recording, supplied from the image and audio signal processing circuit 94, on the magnetic tape 87. On the other hand, the capstan control circuit 93 effects speed control using the CFG signal and at the same time tracking control using a control signal (CTL signal) or a pilot signal, although it is not indicated in the figure, to control forwarding of the magnetic tape 87. Then reproducing image and audio signals reproduced by the magnetic heads 3A and 3B are restored into original image and audio signals in the image and audio signal processing circuit 94 to be outputted through the output terminals 96 and 98. As described above, when the motor control device previously described is introduced into the drum control system for VTR, it is possible to rotate stably the drum and thus to reproduce images and sounds with a high quality.

Although explanation has been made in the different embodiments described above, taking a control device for a drum motor as an example, it is clear that the present motor control device is useful naturally for controlling not only a capstan motor but also other motors.

As explained above, it is possible to suppress efficiently the non-uniform components in the DFG signal by an easy digital processing to rotate stably a motor with a high precision, even if the motor is cheap. Further, even in the case where the sampling rate in the phase control system is increased by using DFG signals, it is possible to suppress influences of the non-uniform components on the DFG signal in the speed control system and the phase control system in a simple and efficient manner to rotate stably the motor with a high precision and to reduce jitter in recording and reproducing images, when applied to VTR, etc.

What is claimed is:

1. An apparatus for stabilizing rotation of a motor comprising:

a frequency signal generating means for generating a frequency signal proportional to a rotation frequency in response to rotation of the motor;

a frequency measuring means for measuring a period of said frequency signal;

a signal comparing means for comparing the period of said frequency signal with a predetermined control target period to generate a first speed error signal;

a filter means receiving the first speed error signal, for eliminating rotation frequency components of the motor and harmonic components both contained in said first speed error signal to output a second speed error signal; and feedback means for feeding back negatively said second speed error signal from said filter means to the motor;

wherein said filter means is constructed by using a feedback type comb-shaped filter and a feedback system of the feedback type comb-shaped filter includes at least blocks having following characteristics represented by transfer functions G1(Z) and G2(Z)

$$G1(Z) = K1 \times \frac{Z(-N)}{[1 - Z(-N)]}$$

(K1: real number, K1<1; N: integer, N>2) and $$G2(Z) = \frac{1}{1 + K2 \times \frac{Z(-M)}{[1 - Z(-M)]}}$$

(K2: real number, K2<1; M: integer, N>M).

2. An apparatus for stabilizing rotation of a motor according to claim 1, wherein a transfer function of said filter means is given by:

$$G(Z) = \frac{A(Z)}{A(Z) + B(Z)}$$

where a transfer function is represented by:

$$\frac{1}{1 + G1(Z) \cdot G2(Z)}$$

wherein both the equation $$G1(Z) = K1 \frac{Z(-N)}{[1 - Z(-N)]} \text{ and}$$

the equation $$G2(Z) = K1 \frac{1}{1 + K2 \frac{Z(-M)}{[1 - Z(-M)]}}$$

are substituted for G1(Z) and G2(Z), and made simplified with use of $$A(Z)=K2 \times Z(-M) \times [1-Z(-N)]+[1-Z(-N)] \times [1-Z(-M)]$$

and $$B(Z)=K1 \times Z(-N) \times [1-Z(-M)]$$

the transfer function is represented by Z-transformation in which both Z(−N) and Z(−M) represent time delay for N-sample time and M-sample time in a digital filter, respectively (K1, K2: real number, K1<1, K2<1, N, M: integer, N>M≧1).

3. A motor control device according to claim 2, further comprising a speed error judging means for judging whether an absolute value of said first speed error signal from said signal comparing means is smaller than a predetermined value or not, and means for making said filter means stop to eliminate rotation frequency components of the motor and harmonic components thereof, in the case where the absolute value of said first speed error signal exceeds the predetermined value, based on a result of speed error judgment.

4. A motor control device according to claim 3, wherein the frequency signal generated by said frequency signal generating means has N periods for every turn of the motor.

5. An apparatus for stabilizing rotation of a motor comprising:

a frequency signal generating means for generating a frequency signal proportional to a rotation frequency in response to rotation of the motor;

a period measuring means for measuring a period of said frequency signal;

a signal comparing means comparing the period of said frequency signal with a predetermined control target period, for generating a first speed error signal;

a filter means receiving the first speed error signal, for extracting rotation frequency components of the motor and harmonic components both contained in said first speed error signal and eliminating the rotation frequency components of the motor and harmonic components from said first speed error signal to output a second speed error signal;

a phase comparing means comparing said frequency signal with a predetermined reference phase signal, for generating a first phase error signal;

an integrating means for accumulating successively the rotation frequency components of the motor and harmonic components thereof both extracted by said filter means;

a subtracting means for subtracting the rotation frequency components of the motor and the harmonic components thereof both accumulated by said integrating means from said first phase error signal to output a second phase error signal;

an adding means for adding said second speed error signal outputted by said filter means to said second phase error signal outputted by said subtracting means to output an added error signal; and a signal feedback means for feeding back negatively said added error signal from said adding means to the motor.

6. A motor control device according to claim 5, further comprising a speed error judging means for judging whether an absolute value of said first speed error signal from said signal comparing means is smaller than a predetermined value or not, and a means for making said filter means stop to eliminate rotation frequency components of the motor and harmonic components thereof, in the case where the absolute value of said first speed error signal exceeds the predetermined value, based on a result of speed error judgment.

7. A motor control device according to claim 6, wherein said integrating means consists of a latch means and an adding means and said latch means is provided with a means, which is reset at a predetermined phase of the rotation of the drum.

8. A motor control device according to claim 7, further comprising a coefficient means for multiplying the accumulated rotation frequency components of the motor and the harmonic components thereof in said subtracting means by a predetermined coefficient, depending on a ratio of a resolution for said first speed error signal from said signal comparing means to a resolution for said first phase error signal from said phase comparing means, an output signal from said coefficient means being subtracted from said first phase error signal.

9. An apparatus for stabilizing rotation of a motor comprising:

a frequency signal generating means for generating a frequency signal proportional to a rotation frequency in response to rotation of the motor;

a phase comparing means comparing said frequency signal with a predetermined reference phase signal, for generating a first phase error signal;

a filter means receiving the first phase error signal, for extracting and eliminating rotation frequency components of the motor and harmonic components thereof both contained in said first phase error signal to output a second phase error signal;

a period measuring means for measuring a period of said frequency signal;

a signal comparing means comparing the period of said frequency signal with a predetermined control target period, for generating a first speed error signal;

a differentiating means for calculating successively variations in both the rotation frequency components of the motor and the harmonic components thereof as extracted by said filter means;

a subtracting means for subtracting the variations in the rotation frequency components of the motor and the harmonic components thereof, both of which are outputs of said differentiating means from said first speed error signal thereby to output a second speed error signal;

an adding means for adding said second phase error signal outputted by said filter means to said second speed error signal outputted by said subtracting means to output an added error signal; and a signal feedback means for feeding back negatively said added error signal from said adding means to the motor.

10. A motor control device according to claim 9, further comprising a phase error judging means for judging whether an absolute value of said first phase error signal from said phase comparing means is smaller than a predetermined value or not, and a means for making said filter means stop to extract and eliminate rotation frequency components of the motor and harmonic components thereof, in the case where the absolute value of said first phase error signal exceeds the predetermined value, based on a result of phase error judgment.

11. A motor control device according to claim 10, further comprising a coefficient means for multiplying rotation frequency components of the motor and harmonic components thereof in said subtracting means by a predetermined coefficient, depending on a ratio of a resolution for said first speed error signal from said signal comparing means to a resolution for said first phase error signal from said phase comparing means, an output signal from said coefficient means being subtracted from said first speed error signal.

12. A magnetic recording and reproducing apparatus comprising:

a magnetic head;

a drum, on which said magnetic head is mounted;

a drum motor, which drives said drum;

a drum motor control means for controlling said drum motor;

a magnetic tape;

a capstan and a capstan motor for forwarding said magnetic tape;

a capstan motor control means for controlling said capstan motor; and a processing means for recording and reproducing at least either one of image signals and audio signals;

wherein said drum motor control means includes:

a frequency signal generating means for generating a frequency signal proportional to said rotation frequency in response to rotation of the motor;

a period measuring means for measuring a period of said frequency signal:

a signal comparing means for comparing the period of said frequency signal with a predetermined control target period to generate a first speed error signal;

a filter means receiving the first speed error signal, for eliminating rotation frequency components of said motor and harmonic components both contained in said first speed error signal to output a second speed error signal; and a signal feedback means for negatively feeding-back said second speed error signal from said filter means to said motor;

wherein said filter means has a feedback type comb-shaped filter construction; and characteristics of a feedback system in said filter means are provided at least with characteristics whose transfer function G1(Z) satisfies;

$$G1(Z) = K1 \times \frac{Z(-N)}{[1 - Z(-N)]}$$

(K1: real number, K1<1; N: integer, N>2) and characteristics whose transfer function G2(Z) satisfies;

$$G2(Z) = \frac{1}{1 + K2 \times \frac{Z(-M)}{[1 - Z(-M)]}}$$

(K2: real number, K2<1; M: integer, N>M).

13. A magnetic recording and reproducing apparatus comprising:

a magnetic head;

a drum, on which said magnetic head is mounted:

a drum motor, which drives said drum;

a drum motor control means for controlling said drum motor;

a magnetic tape;

a capstan and a capstan motor for forwarding said magnetic tape;

a capstan motor control means for controlling said capstan motor; and a processing means for recording and reproducing at least either one of image signals and audio signals;

wherein said drum motor control means includes:

a frequency signal generating means for generating a frequency signal proportional to said rotation frequency in response to rotation of the motor;

a period measuring means for measuring a period of said frequency signal;

a signal comparing means comparing the period of said frequency signal with a predetermined control target period, for generating a first speed error signal;

a filter means receiving the first speed error signal, for extracting and eliminating rotation frequency components of the motor and harmonic components both contained in said first speed error signal to output a second speed error signal;

a phase comparing means comparing said frequency signal with a predetermined reference phase signal, for generating a first phase error signal;

an integrating means for accumulating successively both the rotation frequency components of the motor and harmonic components thereof as extracted by said filter means;

a subtracting means for subtracting the rotation frequency components of the motor and the harmonic components thereof both accumulated by said integrating means from said first phase error signal to output a second phase error signal;

an adding means for adding said second speed error signal outputted by said filter means to said second phase error signal outputted by said subtracting means to output an added error signal; and a signal feedback means for feeding back negatively said added error signal from said adding means to the motor.

\* \* \* \* \*